(12) United States Patent
Fellman et al.

(10) Patent No.: US 8,891,504 B2
(45) Date of Patent: *Nov. 18, 2014

(54) METHODS AND APPARATUS FOR PROVIDING QUALITY OF SERVICE GUARANTEES IN COMPUTER NETWORKS

(71) Applicants: Ronald D. Fellman, San Diego, CA (US); Rene L. Cruz, La Jolla, CA (US); Douglas A. Palmer, San Diego, CA (US); Bart Schade, Solana Beach, CA (US)

(72) Inventors: Ronald D. Fellman, San Diego, CA (US); Rene L. Cruz, La Jolla, CA (US); Douglas A. Palmer, San Diego, CA (US); Bart Schade, Solana Beach, CA (US)

(73) Assignee: Great Links G.B. Limited Liability Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/646,324

(22) Filed: Oct. 5, 2012

(65) Prior Publication Data

US 2013/0073679 A1    Mar. 21, 2013

Related U.S. Application Data

(63) Continuation of application No. 12/127,250, filed on May 27, 2008, now Pat. No. 8,306,053, which is a continuation of application No. 10/688,787, filed on Oct. 17, 2003, now abandoned, which is a continuation-in-part of application No. 09/764,799, filed on Jan. 19, 2001, now Pat. No. 7,102,677, which is a continuation of application No. 09/224,557, filed on Dec. 30, 1998, now Pat. No. 6,267,679, which is a continuation-in-part of application No. 09/136,706, filed on Aug. 19, 1998, now Pat. No. 6,215,797.

(51) Int. Cl.
*H04W 4/00* (2009.01)
*H04L 12/64* (2006.01)

(52) U.S. Cl.
CPC ..... *H04L 12/6418* (2013.01); *H04L 2012/6445* (2013.01)
USPC ........................... 370/341; 370/329; 370/314

(58) Field of Classification Search
USPC .......... 370/462, 442, 461, 446, 341, 329, 314
See application file for complete search history.

(56) References Cited

U.S. PATENT DOCUMENTS

| 4,319,353 A | 3/1982 | Alvarez, III et al. |
| 4,346,470 A | 8/1982 | Alvarez, III et al. |

(Continued)

OTHER PUBLICATIONS

U.S. Appl. No. 09/761,207, filed May 31, 2001, Fellman et al.

(Continued)

*Primary Examiner* — Ricky Ngo
*Assistant Examiner* — Dewanda Samuel
(74) *Attorney, Agent, or Firm* — Novak Druce Connolly Bove + Quigg LLP

(57) ABSTRACT

An arbitration mechanism provides quality of service guarantees for time-sensitive signals sharing a local area computer network with non-time-sensitive traffic. Device adapters are placed at all access points to an Ethernet network. The device adapters limit admission rates and control the timing of all packets entering the network. By doing so, collisions are eliminated for timesensitive traffic, thereby guaranteeing timely delivery. A common time reference is established for the device adapters. The time reference includes a frame with a plurality of phases. Each of the phases is assigned to a device adapter. Each device adapter is allowed to transmit packets of data onto the network only during the phase assigned thereto. The length of the phases may be modified in accordance with the number of packets to be transmitted by a particular device adapter. A master device adapter may be appointed to synchronize each of the device adapters.

20 Claims, 20 Drawing Sheets

(56) References Cited

U.S. PATENT DOCUMENTS

| | | | |
|---|---|---|---|
| 4,412,326 A | 10/1983 | Limb | |
| 4,581,735 A | 4/1986 | Flamm et al. | |
| 4,682,324 A | 7/1987 | Ulug | |
| 4,949,336 A | 8/1990 | Hamada et al. | |
| 5,020,020 A * | 5/1991 | Pomfret et al. | 709/235 |
| 5,289,466 A | 2/1994 | Nobutoki et al. | |
| 5,307,350 A | 4/1994 | McIntyre | |
| 5,381,413 A | 1/1995 | Tobagi et al. | |
| 5,404,353 A | 4/1995 | Ben-Michael et al. | |
| 5,418,784 A | 5/1995 | Ramakrishnan et al. | |
| 5,432,907 A | 7/1995 | Picazo, Jr. et al. | |
| 5,434,861 A * | 7/1995 | Pritty et al. | 370/449 |
| 5,436,903 A | 7/1995 | Yang et al. | |
| 5,485,147 A * | 1/1996 | Jaffe et al. | 370/445 |
| 5,490,143 A | 2/1996 | Hara et al. | |
| 5,526,344 A | 6/1996 | Diaz et al. | |
| 5,526,355 A | 6/1996 | Yang et al. | |
| 5,528,513 A | 6/1996 | Vaitzblit et al. | |
| 5,559,796 A | 9/1996 | Edem et al. | |
| 5,604,742 A | 2/1997 | Colmant et al. | |
| 5,615,211 A | 3/1997 | Santore et al. | |
| 5,648,958 A | 7/1997 | Counterman | |
| 5,648,959 A | 7/1997 | Ilyadis et al. | |
| 5,668,811 A | 9/1997 | Worsley et al. | |
| 5,684,802 A | 11/1997 | Perreault et al. | |
| 5,699,515 A | 12/1997 | Berkema et al. | |
| 5,706,440 A | 1/1998 | Compliment et al. | |
| 5,717,855 A * | 2/1998 | Norman et al. | 709/250 |
| 5,732,094 A | 3/1998 | Petersen et al. | |
| 5,761,430 A | 6/1998 | Gross et al. | |
| 5,761,431 A | 6/1998 | Gross et al. | |
| 5,764,895 A | 6/1998 | Chung | |
| 5,774,658 A * | 6/1998 | Kalkunte et al. | 709/230 |
| 5,790,786 A | 8/1998 | Wakeman et al. | |
| 5,796,738 A | 8/1998 | Scott et al. | |
| 5,878,232 A | 3/1999 | Marimuthu | |
| 5,903,774 A | 5/1999 | Hannah | |
| 5,905,869 A | 5/1999 | Hornung et al. | |
| 5,923,663 A | 7/1999 | Bontemps et al. | |
| 5,926,504 A | 7/1999 | Andersson et al. | |
| 5,936,962 A * | 8/1999 | Haddock et al. | 370/446 |
| 5,940,399 A * | 8/1999 | Weizman | 370/445 |
| 5,949,818 A | 9/1999 | Chiou et al. | |
| 5,953,344 A | 9/1999 | Dail et al. | |
| 5,954,796 A | 9/1999 | McCarty et al. | |
| 5,960,001 A | 9/1999 | Shaffer et al. | |
| 5,978,373 A | 11/1999 | Hoff et al. | |
| 5,991,303 A | 11/1999 | Mills | |
| 5,999,538 A | 12/1999 | Haddock et al. | |
| 6,006,271 A | 12/1999 | Grabiec et al. | |
| 6,009,081 A | 12/1999 | Wheeler et al. | |
| 6,020,931 A | 2/2000 | Bilbrey et al. | |
| 6,038,215 A | 3/2000 | Uekumasu et al. | |
| 6,052,375 A | 4/2000 | Bass et al. | |
| 6,076,115 A * | 6/2000 | Sambamurthy et al. | 709/250 |
| 6,134,223 A | 10/2000 | Burke et al. | |
| 6,172,983 B1 | 1/2001 | Shaffer et al. | |
| 6,181,694 B1 | 1/2001 | Pickett | |
| 6,198,722 B1 | 3/2001 | Bunch | |
| 6,215,797 B1 | 4/2001 | Fellman et al. | |
| 6,246,702 B1 | 6/2001 | Fellman et al. | |
| 6,307,839 B1 | 10/2001 | Gerszberg et al. | |
| 6,359,899 B1 * | 3/2002 | Krishnakumar et al. | 370/444 |
| 6,370,159 B1 | 4/2002 | Eidson | |
| 6,507,585 B1 | 1/2003 | Dobson | |
| 6,778,551 B1 * | 8/2004 | Oh | 370/445 |
| 6,819,676 B1 * | 11/2004 | Min | 370/448 |
| 6,993,042 B1 | 1/2006 | Akatsuka et al. | |
| 7,020,156 B2 | 3/2006 | Vanderzee et al. | |
| 2008/0089355 A1 * | 4/2008 | Lo et al. | 370/448 |

OTHER PUBLICATIONS

J.W. Gluck, "Spread-Spectrum Group Access: Fundamentals and Preliminary REsults," 1989 Conf. on Information Sciences and Systems, p. 320, Mar. 1989.

I. Rubin, "Group Random-Access Disciplines for Multi-Access Broadcast Channels," IEEE Trans. on Information Theory, vol. IT-24, No. 5, pp. 578-592, Sep. 1978.

* cited by examiner

METHODS AND APPARATUS FOR PROVIDING QUALITY OF SERVICE GUARANTEES IN COMPUTER NETWORKS

CROSS REFERENCE TO RELATED APPLICATIONS

The present invention is a continuation of U.S. patent application Ser. No. 12/127,250, filed May 27, 2008, which is a continuation of U.S. patent application Ser. No. 10/688,787, filed Oct. 17, 2003, which is a continuation-in-part application of U.S. patent application Ser. No. 09/764,779, filed Jan. 17, 2001, which is a continuation of Ser. No. 09/224,577, filed Dec. 31, 1998, U.S. Pat. No. 6,246,702, which is a continuation-in-part of Ser. No. 09/136,706, filed Aug. 19, 1998, U.S. Pat. No. 6,215,797, which are hereby incorporated by reference in their entirety.

FIELD OF THE INVENTION

The present invention is related to computer networks and, more particularly, to network apparatus and associated methods that allows real-time traffic such as telephone and video to share a computer network with non-real-time traffic. The methods and apparatus of the present 10 invention provide quality-of-service latency and bandwidth guarantees for time-sensitive signals sharing, for example, an Ethernet network with non-time sensitive signals.

BACKGROUND OF THE INVENTION

Computer telephony, that is, the delivery of telephone calls over computer networks, has recently become a focus of attention due to the potential cost savings of sharing these modem high-bandwidth facilities for multiple uses. Because computer networks packetize signals and then mix such packetized signals (or more simply, packets) from many sources over a single link, networks can make more efficient use of communications resources than conventional circuits witched telephone systems. Furthermore, computer networks leverage the mass-production cost savings and technological advances of commodity products. This sharing of computer communications for non-computer signals therefore has the potential to greatly lower the cost of communications when used with telephone signals.

Computer network traffic from telephone, video, and other time-sensitive sources are generally referred to as real-time traffic because such traffic must arrive at a destination within a specified deadline. Real-time traffic generated from audio or video sources is usually generated in equally spaced time intervals. This type of periodic real-time traffic is referred to as isochronous traffic.

When isochronous traffic is digitized and combined with the sophisticated computer-processing compression techniques, the result is a significant reduction in bandwidth requirements. This use of computer technology to send telephone and video signals thereby results in even further cost savings.

However, conventional computer networks are not designed to handle real-time traffic. Collisions and congestion can induce delays and retransmissions, and can cause real-time traffic, such as video, audio, telemetry, and control signals, to arrive late at a destination, thereby missing a deadline. Furthermore, such collision-induced delays are stochastic by nature and therefore unpredictable. Isochronous traffic sources become bursty after traveling through such networks. As a result, the quality of telephone calls placed over the Internet and computer networks in general is very poor at present.

Ethernet computer networks, in particular, use a form of media access control known as Carrier Sense Multiple Access with Collision Detect (CSMA/CD), also sometimes known as Aloha. This protocol is described in detail by the IEEE Standard 802.3. It provides a very simple and effective mechanism for allowing multiple packet sources to share a single broadcast computer network medium. To transmit a new packet, a transmitter need only listen to the network to sense that no packet is currently being transmitted. As a transmitted packet is broadcast to all receivers on the local network, listening to the network for activity is trivial. If a transmitter wishing to send a packet senses that a packet is currently being transmitted, then the transmitter defers transmission until it senses that the network is inactive. Collisions naturally arise as part of this mechanism. The most common scenario leading to a collision is where two or more stations, which are deferring their own respective transmissions during the transmission of another packet, sense a lack of activity at nearly the same time. The protocol detects collisions, and then aborts and reschedules transmission of all packets for a random time later. This protocol, while simple and effective for computer traffic, introduces collisions and delays as part of its natural operation. In fact, overloading such a network causes the entire network to become unusable, resulting in a significant reduction in throughput.

Ethernet is now ubiquitous throughout the Internet within local-area computer networks, or intranets. The use of variable packet sizes. and Carrier Sense Multiple Access with Collision Detect for link access and control creates an even less predictable and less controllable environment for guaranteeing quality of service. This is of particular concern for wide-area real time traffic that must traverse a plurality of Ethernet networks in order to reach a final destination.

DESCRIPTION OF RELEVANT PRIOR ART

A conventional Ethernet network 1 is shown in FIG. 1*a*. Conventional Ethernet devices 100, such as personal computers and printers, generate non-real-time traffic and are referred to herein as Non-Real-Time Devices (NRTDs). The NRTDs 100 have a standard Ethernet interface IO and attach to the conventional Ethernet network 1 through Network Interface Points 2. The Network Interface Points 2 could represent a 10Base-T port, a 100Base-TX port, a 10Base-(ThinLAN) port, for example. The Network Interface Points 2 may be interconnected by Repeaters or Ethernet Hubs 3.

In conventional Ethernet networks, the attached devices 100 are called stations. When a station transmits a packet on the network, the signal is broadcast throughout the network. For a transmission to be successfully received by another station, there must be no other simultaneous transmissions. Thus, an arbitration mechanism to share the network is required. Ethernet networks use an arbitration mechanism known Carrier Sense Multiple Access with Collision Detect (CSMA/CD).

FIG. 1*b* provides an example that illustrates how the CSMA/CD protocol works. A time line of events is illustrated, representing the actions of five stations, labeled Station A, Station B, Station C, Station D, and Station E. These five stations could represent the five NRTDs in FIG. 1*a*, for example. In this example, Station A transmits a packet 10 on the network after sensing that the network is idle. During the transmission of this packet 10, Station B generates a packet 12 to transmit on the network, but defers the transmission (indicated by numeral 11) because Station B senses activity on the network, due to the transmission 10 from Station A. As soon as Station B senses that the network is idle, Station B waits an additional amount of time, known as the Inter-Packet Gap (IPG) 19, prior to transmitting a packet onto the network. In 10 Mbit/sec Ethernet networks, for example, the IPG is defined to be 9.6 microseconds, or 96 bit times. This constraint results in a minimum time spacing between packets. After Station B waits for an additional LPG seconds, it transmits the queued packet 12. Accordingly, by sensing the network for activity, collisions can be avoided. Collisions, which occur when two or more stations transmit simultaneously on the network, are still possible, however, due to non-zero latency of detecting the state of the network and non-zero propagation delay of signals between the stations. As shown in FIG. 1*b*, for example, after Station B finishes transmitting a packet 12, the network becomes idle. Sometime later, Station C transmits a packet 13 on the network after sensing that the network is idle. During this transmission from Station C, both Stations D and E each happen to generate a packet for transmission onto the network. As activity is detected on the network, due to the transmission 13 from Station C, Stations D and E defer their respective transmissions (indicated by numerals 14 and 15) until the network is sensed idle. Stations D and E will sense that the network is idle at nearly the same time and will each wait an additional IPG 19 before transmitting their respective packets. Station D and Station E will then start transmitting packets on the network at nearly the same time, and a collision 16 then occurs between Station D and station E. The second station to start transmitting during the collision, say Station E, may or may not be able to detect the beginning of the transmission from the first station that starts transmitting, say Station D. In the latter case, Station E does not know that a collision will occur when beginning transmission. In the former case, Station E is still allowed to start transmitting the packet, even though Station E "knows" that transmission will cause a collision, as long as no activity is detected during the first ⅔ of the IPG. This provision provides a degree of fairness in preventing certain stations from monopolizing the network, due to timing differences across stations or location-dependent factors. During the initial part of the transmissions from Stations D and E, both stations sense that a collision 16 occurs, continue to transmit for 32 bit times, and then abort the transmission. The process of prolonging the collision for 32 bit times is called "jamming" and serves the purpose of ensuring that all stations involved in a collision will detect that a collision has in fact occurred. By aborting transmission after the "jamming" process, the network becomes idle sooner than otherwise. After a station involved in a collision aborts transmission, such a station waits a random amount of time before attempting to transmit again. If the stations involved in the collision wait for different amounts of time, another collision is avoided.

The process of waiting a random amount of time until attempting transmission again, after aborting a transmission due to a collision, is called "backing off." The CSMA/CD protocol uses a backing-off mechanism known as binary exponential back off, which is now described. A slot time T is defined to be 512 bit times. For example, in 10 Mbit/sec Ethernet networks, slot time T is approximately 50 microseconds. After a station experiences k collisions for a given packet it is attempting to transmit, the station waits for a time iT before attempting to transmit again, where i is a random integer in the range $0 < i < 2^m$ and $m = \min(k, 10)$. Notice that for a packet experiencing multiple collisions, the average waiting time after each collision doubles until 10 collisions have occurred. After 16 collisions, the station will discard the packet. Such a process provides a mechanism for dynamic load adjustment-many collisions imply a congested network, so the rate of retransmissions is reduced to decrease the probability of further collisions, After backing off, a station again senses the network for activity, deferring if necessary before transmitting again. For example, as shown in FIG. 1*b*, while Station D is backing off (indicated by numeral 17), Station F generates and transmits a packet 18 after detecting that the network is idle. When through backing off, Station D senses activity on the network, due to the transmission 18 from Station F, and thus defers 21 retransmission of the packet. After sensing that the network is idle, Station D then retransmits 22 the original packet that collided earlier, after waiting for IPG 19 seconds. In this example, Station E backs off (indicated by numeral 20) for a longer amount of time, and when Station E is through backing off, Station E senses that the network is idle. Station E then retransmits 23 the packet that collided earlier. Finally, in this example, Station C generates another packet 25 during the retransmission 23 of the packet from Station E, and Station C defers 23 transmission until IPG 19 after Station E completes retransmission.

As discussed earlier, a feature of CSMA/CD is simplicity. However, as noted earlier, packet delays with CSMA/CD are unpredictable and highly variable, making conventional CSMA/CD unsuitable to support real-time traffic. In particular, backing off after several collisions significantly increases the latency suffered by a packet.

One variant of the Ethernet computer network, known as Isochronous Ethernet, also transmits isochronous data but uses a frame form that is not itself packetized. Thus, in Isochronous Ethernet, a special network adapter is required that fragments packets into pieces and then transmits each piece of a packet during a respective time slot of precise and fixed duration. Another specialized network adapter at the receiving end then needs to reconstruct the packet from the pieces for delivery to the device connected thereto. Thus, one drawback is that such Isochronous Ethernet network adapters are not directly compatible with conventional Ethernet network hardware, so that special equipment is required. There are no time periods wherein a regular Ethernet packet may simply flow through a time slot on route. All Ethernet packets are fragmented and placed into multiple time slots. Another drawback is that precise synchronization and scheduling among the Isochronous Ethernet network adapters are crucial for this type of network to function effectively. There is no CSMA/CD protocol within Isochronous Ethernet to avoid collisions should two nodes overlap in their timing. Isochronous Ethernet uses only fixed-sized frames and time slots, so that network bandwidth may be wasted should one or more slots not be utilized.

Additional mechanisms for providing isochronous channels within an Ethernet network are described in U.S. Pat. Nos. 5,761,430 and 5,761,431. While the mechanisms set forth in these patents may overcome some of the drawbacks of Isochronous Ethernet by maintaining compatibility with standard Ethernet, their utility for sending large volumes of non-real-time computer traffic is limited by the requirement of timing and scheduling the transmission of all non-real time packets, as well as real-time packets. Furthermore, like Isochronous Ethernet, the mechanisms set forth in these two patents also require precise synchronization corrections to be propagated throughout the network in each frame. In sending such synchronization packets on a frequent per-frame basis, the large amount of time uncertainty and jitter inherent in Ethernet transmissions and computer interrupt processing actually introduce further synchronization errors and jitter at each frame in these systems. And by requiring a reservation list to be included in each per frame beat packet, the resulting larger synchronization packet size for these conventional mechanisms further increases the potential for timing jitter.

The mechanisms of these two patents further require the dynamic scheduling of packet transmission on a frame-by-frame basis according to the presence or the absence of packets sensed per time interval on the network. Therefore, these mechanisms become untenable for large numbers of independent sources of traffic, as all stations must correctly monitor all packets. Such a system does not scale well to networks with a large number of nodes. In addition, were any single station to encounter an error in reading any of the broadcast packets, such a station could fall out of sync with the rest of the system.

In view of the foregoing, there is still a need in the art for network apparatus and associated methodology that overcomes the limitations of CSMA/CD and provides quality-of service guarantees in computer networks for real-time traffic, while still maintaining full compatibility and utility for non-real-time traffic.

SUMMARY OF THE INVENTION

The present invention provides network apparatus and associated methods for minimizing or substantially eliminating unpredictable delays in networks, particularly broadcast or Ethernet networks. One aspect of the present invention is its ability to create virtual isochronous channels within a CSMA/CD Ethernet network. The present invention provides an arbitration mechanism to control access to the network for time-sensitive signals and to minimize or substantially eliminate collisions. In an Ethernet network, this arbitration mechanism of the invention augments the underlying CSMA/CD arbitration mechanism.

At regular intervals (or "frames"), dedicated time slots (or "phases") are defined during which real-time traffic may be transmitted. A plurality of network devices of this invention are synchronized together to define such frames to coincide on well-defined, periodic boundaries. This invention also provides an associated synchronization mechanism that minimizes jitter and timing uncertainty of frame and phase boundaries. The arbitration mechanism allows the real-time traffic to arrive at its destination with a very low and predictable delay. The introduction of predictability and a tight bounding on the delay allows the network to set guarantees for service quality.

According to one aspect of the present invention, a network for communicating packets of data includes a plurality of devices, for example, real-time and non-real-time devices, and a network medium. A plurality of device adapters connects the devices to the network medium. Each device adapter includes a device interface connected to one of the devices and for receiving packets generated thereby and a network interface connected to the network medium. Each device adapter also includes a processor connected to each of the interfaces for receiving the packets from the device interface and for transmitting the packets to the network interface.

One of the plurality of device adapters may serve as a master timing device that synchronizes a common time reference of the plurality of devices, Alternatively, a master timing device may be incorporated within a specialized Ethernet repeater hub. The common time reference defines a frame of time which, in turn, has a plurality of phases and repeats cyclically. Each of the phases is assigned to a respective device adapter. More than one phase can be assigned to a given device adapter. Each of the device adapters is allowed to transmit the packets received at the device interface during the phase assigned thereto. Accordingly, as no device adapter is able to transmit packets out of phase, collisions are eliminated for packets transmitted in the assigned phases. Furthermore, if a synchronization mismatch occurs, the underlying CSMA/CD protocol intercedes to sense the transmission of a packet in a prior phase and to dynamically hold off transmission of a packet from a succeeding phase so as to prevent a collision. There are no collisions so long as the phase overlap does not exceed the time duration of a minimum-sized packet. Another advantage is that the packets do not need to be reformatted after transmission, so that compatibility with standard Ethernet is maintained.

The plurality of phases may also include a free-access phase, common to all connected device adapters, during which any of the device adapters is able to transmit packets according to, for example, the standard IEEE 502.3 CSMA/CD protocol. The device adapters may use information stored in a header of a packet received from an attached device to determine whether to forward a received packet in an assigned phase, or as a non-real-time packet in the common free-access phase. If a packet is sent in an assigned phase, service quality is guaranteed for the packet. Otherwise, if a packet sent in a free-access phase, the packet contends for network access along with all other device adapters.

The plurality of phases may also include one or more guard phases during which none of the device adapters is able to transmit packets. A guard phase compensates for variations in signal delays between the device adapters. The optional use of a guard phase and CSMA/CD protocol, even among assigned phases, eliminates the need for precise synchronization. Should the transmission time of a first packet extend beyond its assigned phase or a following guard phase, the device adapter associated with the next assigned phase senses this transmission and defers transmission of a second packet until the first packet transmission is completed.

No collisions occur among packet transmissions during assigned phases so long as the device adapters synchronize their phases to within a synchronization tolerance time. This synchronization tolerance time is calculated as the duration of a minimum-sized packet. In the case where a first device adapter sends a first packet within its assigned phase and a second device adapter attempts to transmit a second packet in a subsequent phase, this tolerance assures that the CSMA/CD mechanism will sense the first packet and delay transmission from the second device adapter sending the second packet until the first packet transmission has been completed. Thus, device adapters of this invention only need to be in substantial synchronization and not precise or exact synchronization. Furthermore, a guard phase at the start of a new frame may provide a settling period for any queued packets from the prior free-access phase to ensure that a synchronization signal or a packet from the first assigned phase does not experience collisions.

Each of the phases has a pre-assigned length of time that may vary in proportion to the number of packets scheduled for transmission at the device interface of a respective the device adapter. Accordingly, if a particular device connected to a device adapter is not generating a large number of packets, then the phase assigned to that device adapter may be shortened to eliminate idle time on the network. On the other hand, if a particular device generates a large number of packets, then the phase assigned thereto may be lengthened to accommodate the large traffic. Furthermore, a device adapter is able to use any unused time in an assigned phase that may otherwise be wasted to transmit non-real-time traffic and thereby improve network efficiency of this invention.

The network of the invention may include a plurality of real-time devices, such as telephones, and non-real-time devices, such as computers. The non-real-time devices may include a number native non-real-time devices connected to the network medium directly. When there is a surplus of time to meet deadlines for real-time devices, the transmission of real-time packets may be delayed in deference to non-real-time packets generated by the native non-real-time devices. However, collisions may be forced for non-real-time packets when a scheduled real-time packet may otherwise miss a deadline.

Another aspect of the present invention is the underlying synchronization mechanism. This synchronization mechanism may utilize the availability of inexpensive and stable crystal oscillators (XO). The crystal may be a variable crystal oscillator (VXO) with a narrow range of frequency adjustment, although this is not a requirement for achieving adequate synchronization according to the invention. The XO or VXO operates primarily as a free-running oscillator wherein the accumulated phase mismatch is corrected via an occasional incoming timing signal. When using a VXO, a separate VXO frequency correction signal is generated from the aggregate of many timing-signal phase mismatch measurements to fine-tune the VXO frequency. When using an XO, frequency correction can be achieved through periodic incremental phase adjustments. One of the device adapters may be designated as the master timing device. In this case, the other device adapters, called slave devices, synchronize their internal clock to the master timing source device. Alternatively, the master timing device may be incorporated into a specialized Ethernet repeater hub. In this latter case, all of the attached device adapters function as slave devices and synchronize their internal clock to the master timing source device.

The drift and native frequency mismatch of the slave crystal oscillators (operating under a null correction voltage) with respect to the master sets an upper bound on the frame length. The amount of phase drift when operating with no correction voltage must be small in relation to a minimum packet transmission time. In a preferred embodiment of the invention configured for an Ethernet environment, this phase-drift tolerance typically is on the order of an Ethernet interpacket gap (IPG) over a period of many frame times, typically 10 or greater. Thus, having a correction signal occur within this number of frames synchronizes the common time reference to within an IPG time. The VXO approach of this invention restricts frequency adjustment to a narrow range, uses regression techniques to account for variations in network delays in the determination of the magnitude of the correction, and separates the phase synchronization from the frequency fine-tuning.

Another aspect of the present invention is that the synchronization mechanism may use two types of synchronization signals: a fine resolution synchronization signal and a coarse-resolution synchronization signal. The fine resolution synchronization signal of the present invention need not carry any explicit information, and instead conveys information implicitly through its arrival time. Fine resolution synchronization signals are sent at fixed times relative to the time reference of the master timing source, for example, at the beginning of a frame as defined by the master timing source. In this case, the arrival of the fine resolution synchronization signal at a device adapter triggers a phase-synchronization event at said device adapter, adjusting the next frame boundary if necessary to coincide with the arrival time of the fine resolution synchronization signal plus the nominal duration of the frame. However, the coarse resolution synchronization signal, which is in the form of a frame time-stamp packet, contains a full count of the current time at which the packet is sent, relative to the master tuning device. A coarse resolution synchronization signal can therefore arrive at anytime during the frame to which it refers. If used in conjunction with a fine resolution synchronization signal, the time stamp carried by a coarse resolution synchronization signal need only be precise enough to resolve the current time to within a duration of a frame. The fine resolution synchronization signals, if used, may either be sent via the master timing source or delivered to the device adapters through some external mechanism. The aspect of the present invention of a plurality of fixed-length phases, each given phase being available for the entire duration of its associated isochronous stream, enables the use of Time Division Multiplexing (TDM) as a scheduling mechanism. By predetermining the length of each phase and the streams to which each phase belongs, the TDM scheduling of the present invention assigns isochronous streams to specific phases. This simplifies implementation and robustness by introducing predictability to a system. In TDM, a preset set of times can be broadcast and used to time all packet transmissions.

Advantages of the present invention over conventional approaches for handling real-time traffic include:
compatibility with conventional network devices operating under the IEEE 502.3 standard Ethernet specification;
use of the CSMA/CD media access of IEEE 802.3 for self-adjustment of phase mismatches to further prevent collisions among real-time packets;
ability to provide real-time service guarantees without monitoring or dynamic scheduling of real-time traffic; and
synchronization stability over many frames without the requirement for frequent (per frame) resynchronization.

As a result, devices of the present invention can co-exist in systems incorporating conventional Ethernet interfaces and will not adversely affect an existing network. For example, since the device adapters of this invention do not need to monitor real-time traffic, the device adapters can be used with standard switches and routers, as well as standard repeater hubs. Furthermore, the specialized Ethernet repeater hubs of this invention can be used with standard Ethernet devices.

Other aspects, features, and advantages of the present invention will become apparent to those persons having ordinary skill in the art to which the present invention pertains from the following description taken in conjunction with the accompanying drawings.

DESCRIPTION OF THE INVENTION

Figure 1A:
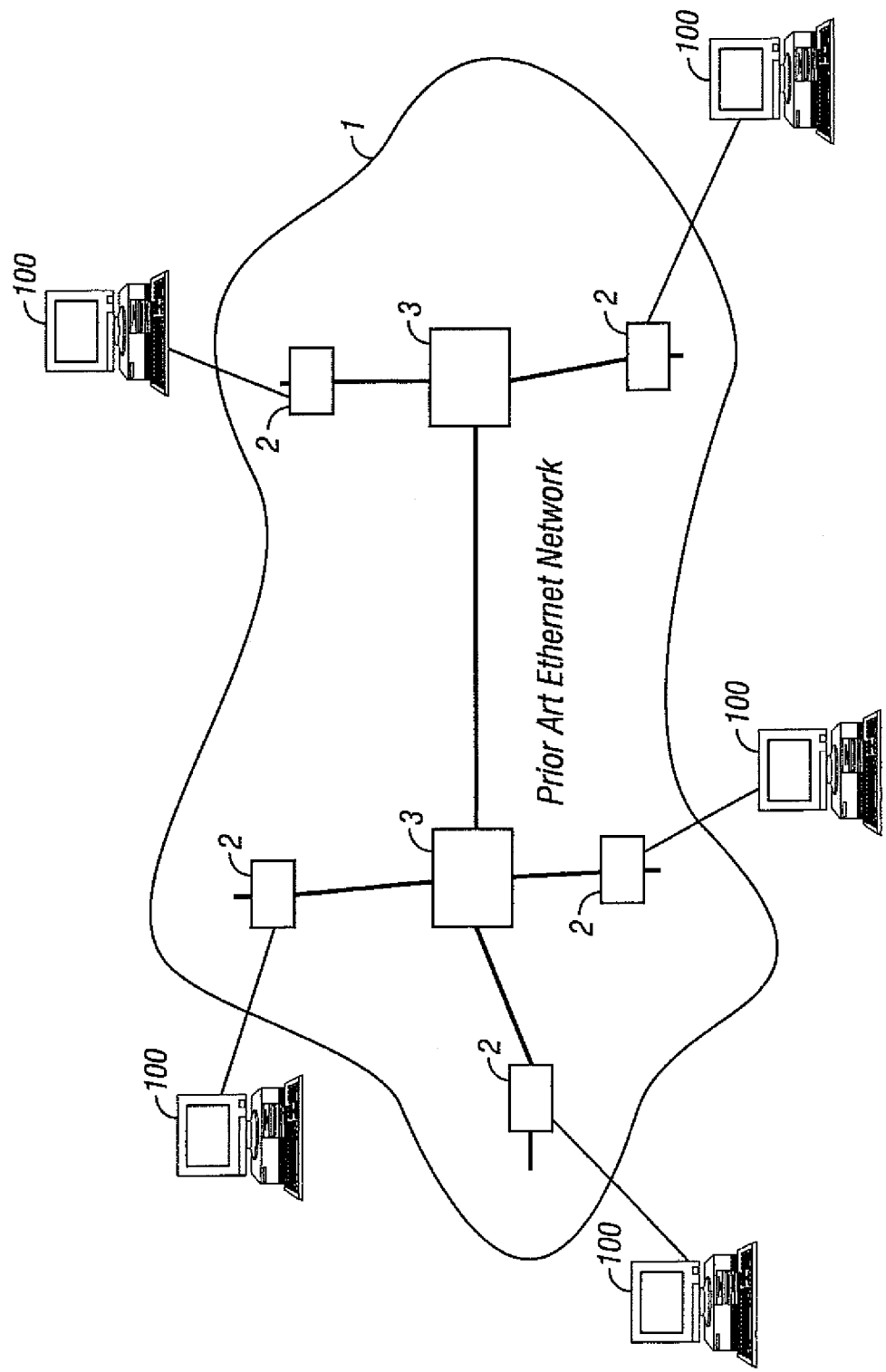
FIG. 1a is a schematic view of a conventional Ethernet network.
Figure 1B:
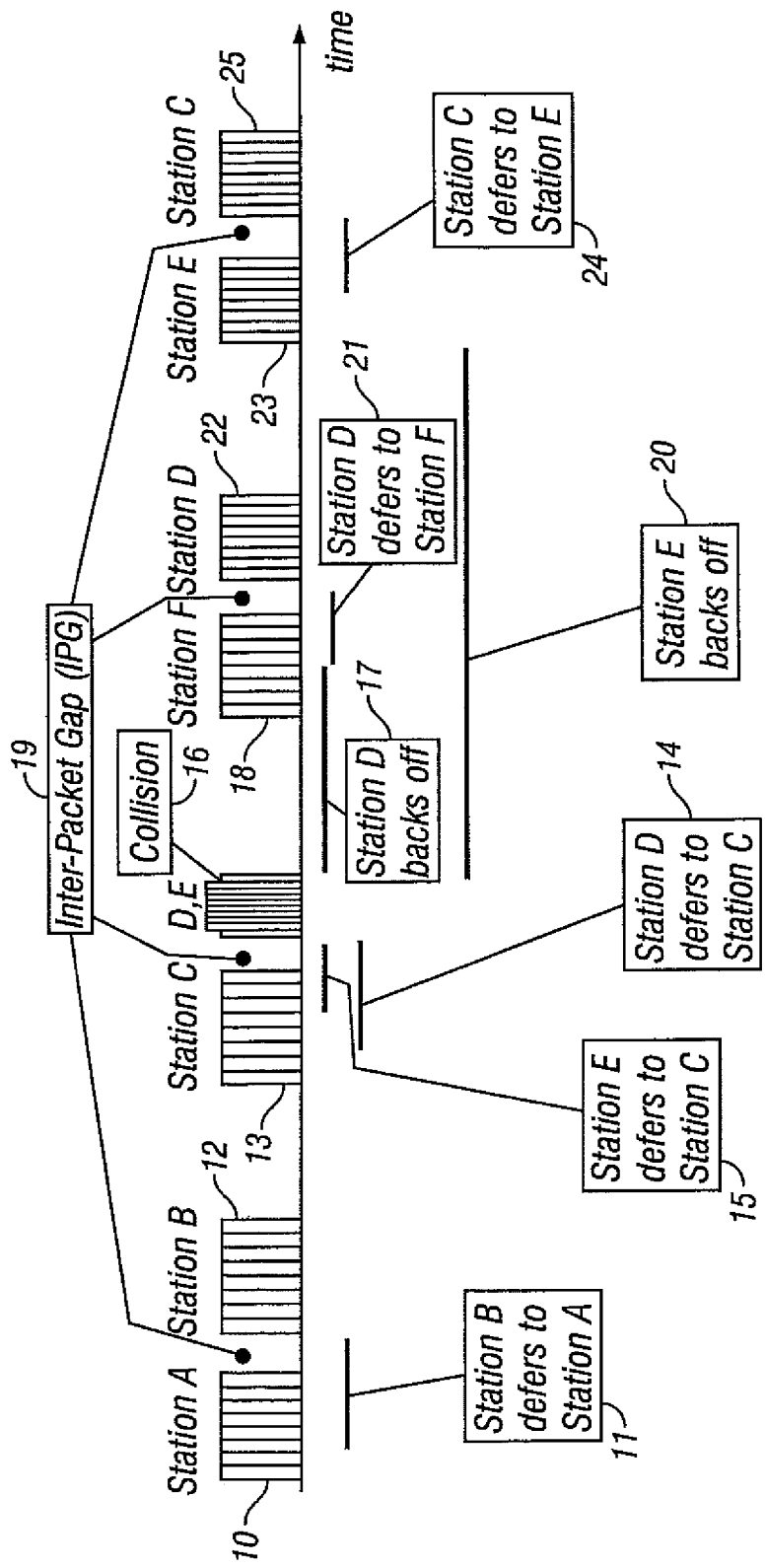
FIG. 1b is a schematic diagram illustrating a CSMA/CD arbitration mechanism in a conventional Ethernet network.
Figure 2:
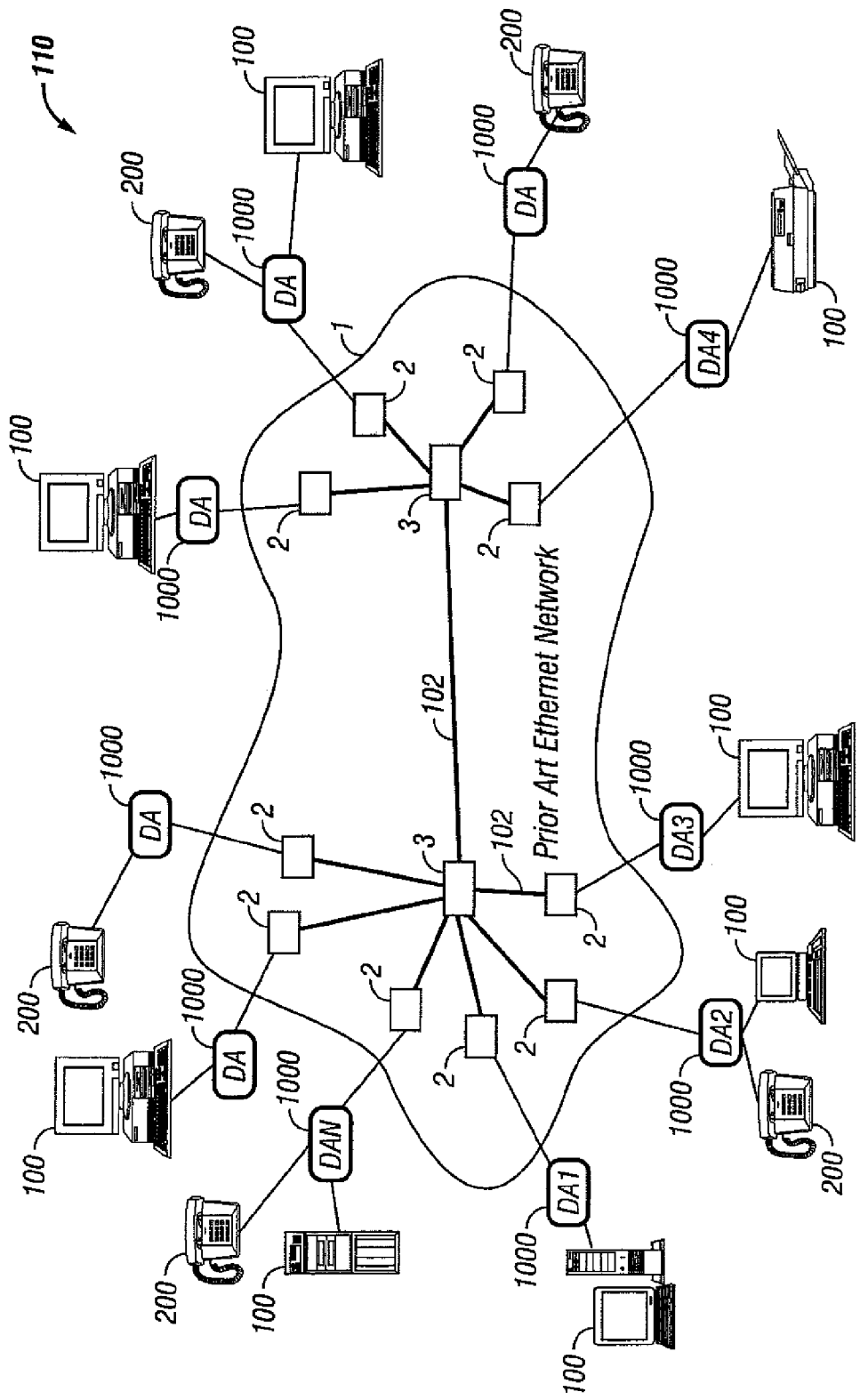
FIG. 2 is a schematic view of an exemplary Ethernet network in accordance with the present invention, particularly illustrating a Conditioned Mode of the network, in which real-time devices and conventional Ethernet devices are attached to the Ethernet network.

Referring to the drawings in more detail, an enhanced network 110 in accordance with the present invention is illustrated in FIG. 2. As will be discussed in more detail below, exemplary network 110 includes a plurality of devices 100 and 200 for generating real-time and/or non-real-time packets of data for transmission across a network medium 112 to a destination on the network 110. Exemplary network 110 also includes a plurality of device adapters (DAs) 1000 which ensure that at least the real-time packets arrive at their destination without colliding with other packets, thus guaranteeing a quality of service unavailable with conventional computer networks.

In addition to the hardware associated with the network 110, the present invention provides an arbitration mechanism to control access to the network for time-sensitive signals and to minimize or substantially eliminate collisions. As discussed in more detail below, at regular intervals (or "frames"), dedicated time slots (or "phases") are defined during which real-time traffic may be transmitted. The arbitration mechanism allows the real-time traffic to arrive at its destination with a very low and predictable delay. The introduction of predictability and a tight bounding on the delay allows the network to set guarantees for service quality.

Continuing to reference FIG. 2, the plurality of device adapters 1000 are connected to the network 110 at network interface points 2. Real-time devices (RTDs) 200, such as telephones and video equipment, are attached to the device adapters 1000. Non-real-time devices (NRTDs) 100, which are attached directly to network interface points in conventional networks, are preferably connected to the device adapters 1000 in accordance with the present invention. The network 110 shown in FIG. 2 is configured in "Conditioned Mode," as all traffic placed on the network is conditioned by the device adapters 1000. The network includes another mode, called "Annex Mode," which will be discussed in more detail below.

The network 110 may include a broadcast portion 1. The broadcast portion 1 is an environment in which packets generated by one station are transmitted to each of the stations on the network (i.e., packets are broadcast throughout the network). Accordingly, collisions would occur in the broadcast portion 1 if the device adapters 1000 of the present invention were not present to control the transmission of packets. The broadcast portion 1 may be an Ethernet network or another type of network generally operating in a broadcast environment.

Figure 3:
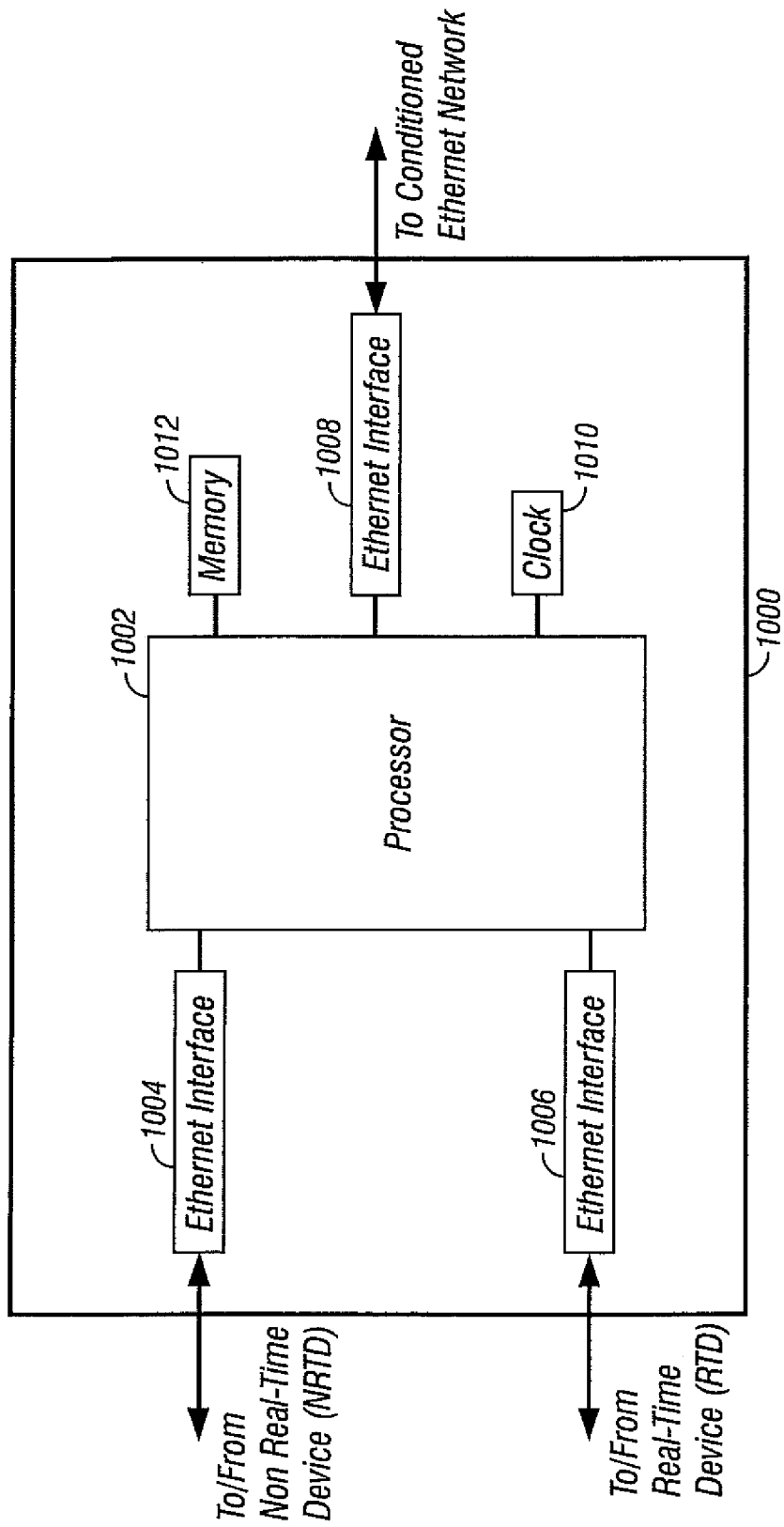
FIG. 3 is a block diagram of an exemplary device adapter of the present invention wherein two Ethernet ports, one dedicated to non-real-time traffic and another dedicated to real-time traffic, are mixed onto a third port that conditions an Ethernet link to allow a mixture of real-time and non-real-time traffic.

An exemplary embodiment of a device adapter 1000 of the present invention is illustrated in FIG. 3. Exemplary device adapter 1000 includes a processor 1002 and a plurality of interfaces 1004, 1006, and 1008. Interface 1004 is connectable to non-real-time devices 100; interface 1006 20 is connectable to real-time devices 200; and interface 100s is connectable to the network: 110. Each device adapter 1000 may also include a local clock 1010 such as a crystal oscillator and a memory 1012. The memory 1012 is connected to and controlled by the processor 1002. In addition to the embodiment shown in FIG. 3, the memory 1012 may be connected directly to the device interfaces 1004 and 1006 or to the network interface 1008 for storing both real-time and non-real-time packets prior to transmission.

As will be discussed in more detail below, the processor 1002 operates in accordance with an arbitration mechanism that substantially eliminates collisions of real-time traffic. The device adapters 1000 may be configured as stand-alone devices which may be connected to the network medium 112, the real-time devices 100, and the non-real-time devices 200. Alternatively, the device adapters 1000 may be configured as adapter cards which may be inserted in expansion slots in, for example, computers (illustrated as NRTDs 100 in FIG. 2) connected-to the network 1.

The RTDs 200 may output data across a standard Ethernet interface. Conventional telephone and video equipment may be interfaced to the device adapters 1000 through an additional device which formats the output of the conventional equipment into Ethernet packets. Such additional formatting devices may be physically incorporated into the device adapters 1000.

To make efficient use of the broadcast medium 1 of the network 110, arbitration mechanisms of the present invention provide the capability of eliminating collisions and congestion in the network. This is accomplished by establishing a common time reference among the device adapters 1000, and then using the common time reference to define periods of time when a particular device adapter has the exclusive right to transmit packets on the network.

One exemplary arbitration mechanism of the invention for obtaining a time reference is to assign one of the device adapters 100 as a master timing device that transmits a synchronization signal at regular intervals or periodically to synchronize the local clock 1010 of each adapter. Alternatively, as discussed in more detail later, the master timing device may be incorporated into a specialized Ethernet repeater hub.

The synchronization signal may be sent every predetermined number of frames, such as every hundred frames at the start of a frame, or every predetermined amount of time, such as 12.5 ms or 25 ms.

In addition, a slave device (i.e., a device adapter which is not the master timing device) 20 may predict or measure the drift of its local clock 1010 with respect to the clock 1010 or time signal of the master timing device. The slave device may then use this drift measurement to adjust its local clock 1010 at regular intervals between synchronization signals from the master timing device. This technique allows the master timing device to transmit synchronization signals at less frequent intervals yet still adequately compensate for local oscillator drift. For example, if the local clocks 1010 are crystal oscillators, then the slave device may predict the drift with relative accuracy. If the drift is predicted to be about 60 us for every second, then for a frame having a length of 25 ms, each slave device would adjust its local clock by 1.5 us per frame, or equivalently, by 60 μs after each 40 frames. If 60 us of clock mismatch are required, then this technique may significantly extend the time interval between master synchronization signals to far longer than one second. Or alternatively, this technique may provide for a significant-tolerance to loss or delay of a synchronization signal.

Alternative methods for obtaining a common time reference will be discussed below. In the case where a standard Ethernet repeater hub 3 is used to interconnect device adapters, a master timing device may be defined as the first of the device adapters 1000 to come on line. If a master timing device goes off line, then a second of the device adapters 1000 to come on line may become the new master timing device, and so on.

By definition, if at a given point in time the common time reference is t, then each of the device adapters 1000 knows the value of t to within a bounded error e, and the absolute value of the difference between the estimates of the common time reference at any two device adapters 1000 is upper bounded by e. For purposes of explanation, it is helpful first to assume that e=0 so that each device adapter knows the exact value of the common time reference.

Arbitration Mechanism

In contrast to conventional arbitration mechanisms, the present invention provides a mechanism in which repeating periodic frames are defined. Each of the frames has an assigned section and an unassigned (or free-access) section. Access to the assigned section is regulated and coordinated while access to the unassigned section is not. The unassigned section may operate in accordance with conventional CSMA/CD Ethernet protocol and may be used for the transmission of non-real-time packets. The assigned section is synchronized, and transmission of packets during the assigned section is coordinated among all the other devices to eliminate collisions. The assigned section is primarily reserved for real-time packets because such packets may be guaranteed with a fixed delivery time or delivery within a deadline.

An exemplary arbitration mechanism of the present invention defines repeating periodic time frames. Each time frame has an assigned (or "owned") section and an unassigned (or "free-access") section. The assigned section is divided into a plurality of phases corresponding to the plurality of device adapters 1000. Each of the phases is assigned to (that is, is owned by) one of the device adapters 1000. Each device adapter 1000 is allowed to transmit packets of date, for example, real-time packets from RTDs 200, only during its assigned (or owned) phase, and is not allowed to transmit packets during the phase assigned to another device adapter. Accordingly, collisions between packets, particularly, real-time packets is eliminated. Each device adapter 1000, however, is allowed to transmit packets during the unassigned (or free-access) phase. This exemplary arbitration mechanism will be discussed in more detail below with particular reference to FIG. 4.

Figure 4:
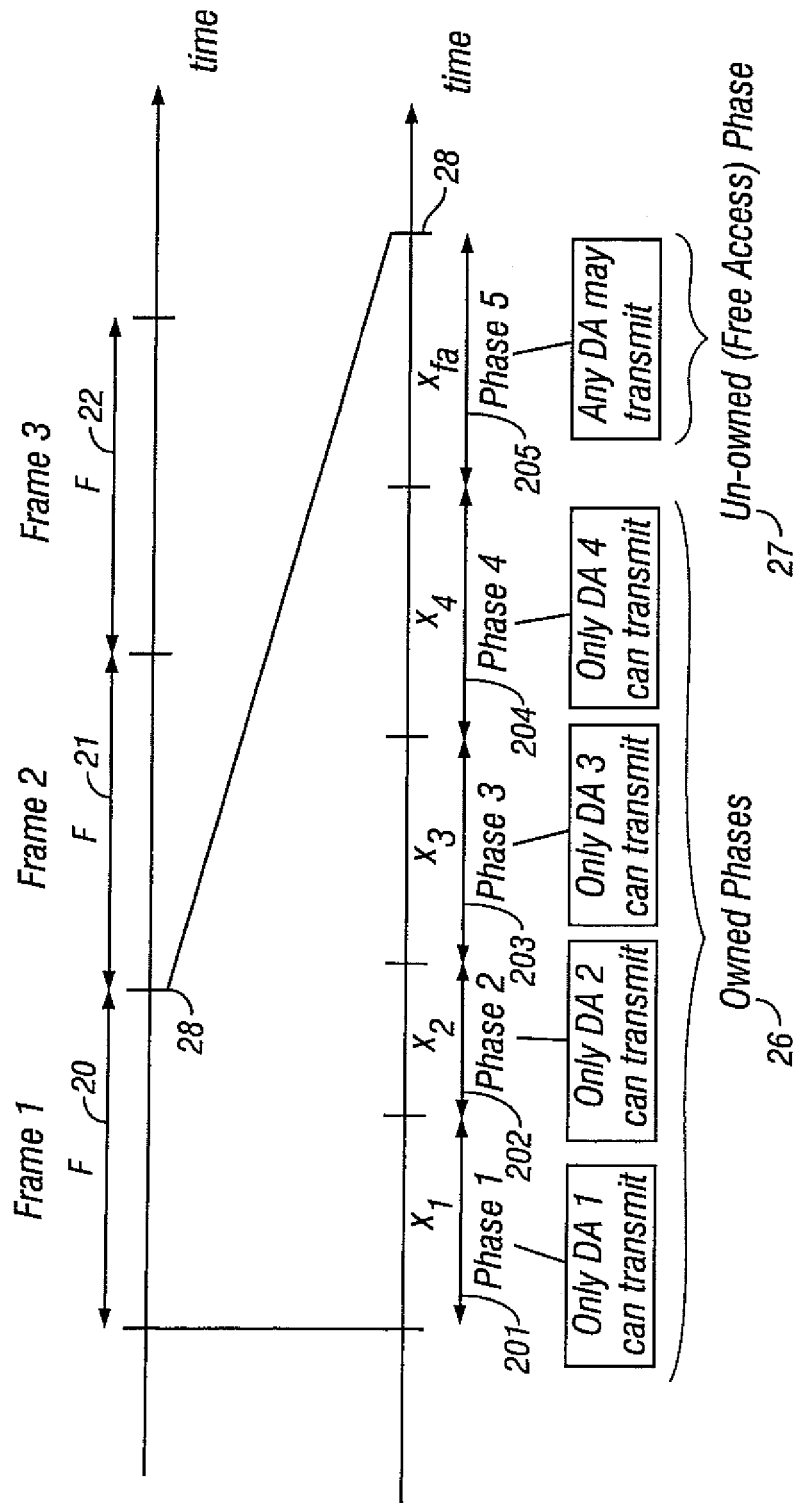
FIG. 4 is a graphical view illustrating the organization of time into repeating frames and time intervals within each frame that define allowable phases for each device to transmit time-sensitive traffic (Conditioned Mode)

As mentioned above, the network of the present invention includes a plurality of device adapters 1000, which plurality is represented by N. The device adapters 1000 may then be respectively indicated by DA1, DA2, DA3, ... DAN. Referring to FIG. 4, time is divided into equal length frames 20, 21, and 22 of duration F, for example, 25 ms. Only three exemplary frames 20, 21, and 22 are shown; however, the frames repeat at a periodic rate. For purposes of this discussion, an embodiment of the network 110 includes four device adapters, i.e., N=4. Relative to the common time reference, the frame boundaries are at times t=nF, where n is an integer. Each frame 20-22 is divided into N+1 non-overlapping intervals called phases., which phases are labeled p=1, 2, 3, ... N+1. In the exemplary embodiment shown in FIG. 4, five phases 201, 202, 203, 204, and 205 for the first frame 20 are shown.

Although each device adapter may own one or more phases, to simplify the explanation of the operation of the present invention, we will take the example where the first N phases are phases respectively owned by the device adapters 100, and which phases are generally indicated by numeral 26. That is, if p satisfies $1 \leq p \leq N$ 5 N, then phase p is owned by or assigned to DAp. A device adapter 1000 is not allowed to transmit packets in any phase except for the phase owned thereby. That is, in this example, device adapter DA1 only transmits in phase 1; device adapter DA2 only transmits in phase 3; and so on. Accordingly, collisions are eliminated during owned phases. The network 110 is then said to be operating in Conditioned Mode. If real-time traffic is transmitted only during owned phases, then this arbitration mechanism eliminates collisions for real-time traffic, The device adapters 1000 may store packets awaiting transmission during the assigned phases 26 in the on-board memory 1012. Alternatively, such packets may be stored in the memory of the generating device 100 or 200 itself.

The assignment of phases 201-205 to the device adapters 1000 may be coordinated by a master scheduling device in response to requests from the other devices. The determination of which device adapter is to be the master scheduling device may be analogous to the determination 30 of the master timing device discussed above; that is, the master scheduling device may be defined as DA1, with each device coming on line subsequently respectively defined as DA2, DA3, and so on. If a specialized Ethernet repeater hub is employed to interconnect the device adapters, a processor within the specialized Ethernet repeater hub may serve as the master scheduling device. Alternatively, the master scheduling device may not be a device adapter but may be another device, such as a computer, connected to one of the device adapters. The master scheduling device may transmit a frame-start signal at the start of every frame 20, 21, 22, and so on. The number of phases in each frame may be defined or created by the master scheduling device in accordance with the number device adapters 1000 that are on line. Accordingly, the number of phases may vary from frame to frame, and the length of each phase may vary within a frame, as well as from frame to frame, in accordance with the volume of packets to be transmitted by a particular device. The master scheduling device may broadcast this information to the device adapters 1000 at the start of each frame. Alternatively, the phases may be of equal length with each device adapter 1000 choosing an unassigned phase by transmitting during the phase, thereby having that particular phase now assigned to the particular device adapter.

Each of the frames 20-22 may have a "guard" band or phase at the start of each frame during which no device adapter 1000 is allowed to transmit packets. The guard phase accounts for variations in signal delays and variability in quenching free-access transmissions from the previous frame. The guard phase will be discussed in more detail below.

With reference to FIG. 2, the network 110 of the present invention may include bridges (switches) and routers. If included, then the bridges and routers are used in place of or in conjunction with repeater hubs 3 within the network. The time synchronization of the device adapters 1000 can still function to eliminate congestion and contention at the bridge, thereby preserving deadlines and guaranteeing quality of service for real-time signals. Furthermore, the aspect of the invention whereby real-time transmissions are pre-assigned phases at the time of the setup of a real-time or isochronous channel allows the invention to avoid the monitoring of the network for determining transmission times. This permits a network of this invention to utilize prior art bridges and routers, as well as bridges and routers incorporating device adapters of this invention.

If the latency of the bridges or routers is small with respect to the duration of a phase, then the traffic conditioning and real-time quality-of-service guarantees of the present invention will continue to function as described. If the latency of prior art bridges or routers is-substantial with respect to the duration of a phase, it may be desirable to surround the prior art bridge or router with device adapters 1000. Alternatively, the device adapters 1000 of the invention may be physically and logically incorporated within a bridge or router. In this case, the device adapters subdivide the network into multiple conditioned domains for each side of a bridge or router wherein a separate framing structure is used within each domain to continue to guarantee service quality. However, in this latter case, there may be at least an additional frame of delay added to the overall latency for packets crossing a conditioned domain.

With continued reference to FIG. 4, in addition to the owned or assigned phases 26, each frame 20, 21, 22 includes an unassigned, unowned, or free-access phase which is indicated by numeral 27. The free-access phase 27 is defined as phase N+1. The free-access phase 27 is defined as a phase in which any of the device adapters 1000 may transmit packets of data. Although the free-access phase 27 may be at any location within the frame, the free-access phase is shown in the drawings as the last phase of a frame.

Arbitration within the free-access phase 27 may operate in accordance with the CSMA/CD protocol. Therefore, collisions may occur during the free-access phase 27. Each device adapter 1000 transmitting a packet during the free-access phase may do so without crossing a frame boundary 28. Thus, towards the end of the free-access phase, a device adapter 1000 may have to refrain from transmitting a packet to ensure that it does not improperly transmit during the following phase.

Each of the phases 1, 2, 3, . . . N has a length of time indicated by $\chi_1, \chi_2, \ldots \chi_N$ respectively. Time $\chi_{fa}$ is the length of the free-access phase 27. As the length of each frame is preferably constant, as represented by F, then the summation of the lengths of the phases 26 and 27 equals the length of the frame, i.e., $\chi_1+\chi_2+ \ldots +\chi_N+\chi_{fa}=F$.

Figure 5:
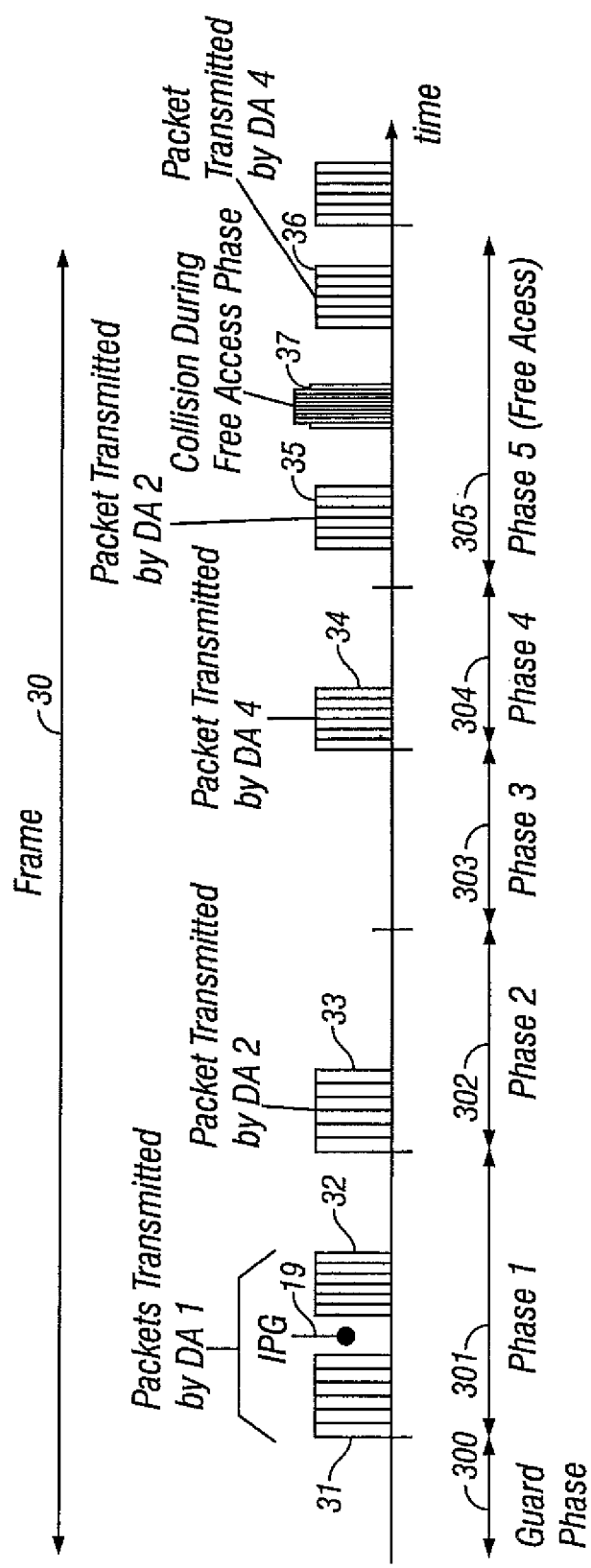
FIG. 5 is a graphical view illustrating an arbitration mechanism in Conditioned Mode of the invention, particularly illustrating the arbitration mechanism in which the duration of each phase is fixed.

An embodiment of the arbitration mechanism of the present invention is illustrated in FIG. 5. In this embodiment, the lengths of the phases 301-305 are constant across the frames. In describing the embodiment, four device adapters (i.e., N=4) are provided, for example. In each frame 30, DA1 transmits two packets 31 and 32 during a first phase 301 with each packet separated by an inter-packet gap (IPG) 19; DA2 transmits a packet 33 during a second phase 302; DA4 transmits a packet 34 during a fourth phase 304, and two packets 35 and 36 are transmitted during a fifth phase 205 separated by a collision 37. During phase p, DAp can transmit real-time traffic as well as non-real time traffic, where 1≤p≤N1. In this example, DA3 does not transmit any packets during its assigned phase.

As mentioned above, each of the frames 30 may include a guard phase 300 at the start of 5 the frame during which time no device adapter 1000 is allowed to transmit packets. If the device delays of the device adapters 1000 are compensated. In addition, the guard phase 300 allows any packets transmitted during the free-access phase 305 from the previous frame, which may not 10 have yet reached their destination, to be delivered. Accordingly, the guard phase 300 is a period of time during which no new packets are transmitted and the network 110 is essentially quiet. In the embodiment including the guard phase 300 at the beginning of each frame, the device adapters 1000 do not need to be precisely synchronized but may operate somewhat out of synch and still guarantee a high quality of service in delivering real-time packets.

Another possible embodiment for an arbitration mechanism of the present invention is to eliminate the free-access phase 405, i.e., $\chi_{fa}=0$, and to dynamically allocate the durations of the owned phases through a token passing mechanism, as in some token ring protocols such as FDDI.

Synchronization

Referring to FIG. 2, according to an exemplary embodiment of the invention, where a standard Ethernet repeater hub 3 is used to interconnect the device adapters, one of the device adapters 1000 may be designated as a master timing device. Any of the device adapters 1000 can be chosen as a master timing device. This master timing device may be the same device adapter as the master scheduling device discussed above or a different device adapter. Furthermore, the master scheduling device and/or the master timing device may not necessarily be device adapters, but some other device, such as a personal computer (PC), compatible with the device adapters of this invention and serving the purposes of this invention. The selection of the master timing device may be determined through either an initialization protocol or a preset switch setting. In a preferred embodiment, an initialization protocol uses a first-initialized-chosen scheme, wherein the first DA 1000 to complete initialization would be chosen as the master, preventing other DAs from becoming a simultaneous master. Alternatively, a lowest media access control (MAC) address-chosen scheme may be used, wherein the master is the device adapter with the lowest MAC address. Regardless of how the master is chosen, the protocol may also include a mechanism to choose an alternate master. The alternate master becomes the master if the protocol senses that the primary (i.e., first-chosen) master has gone off-line.

Figure 6:
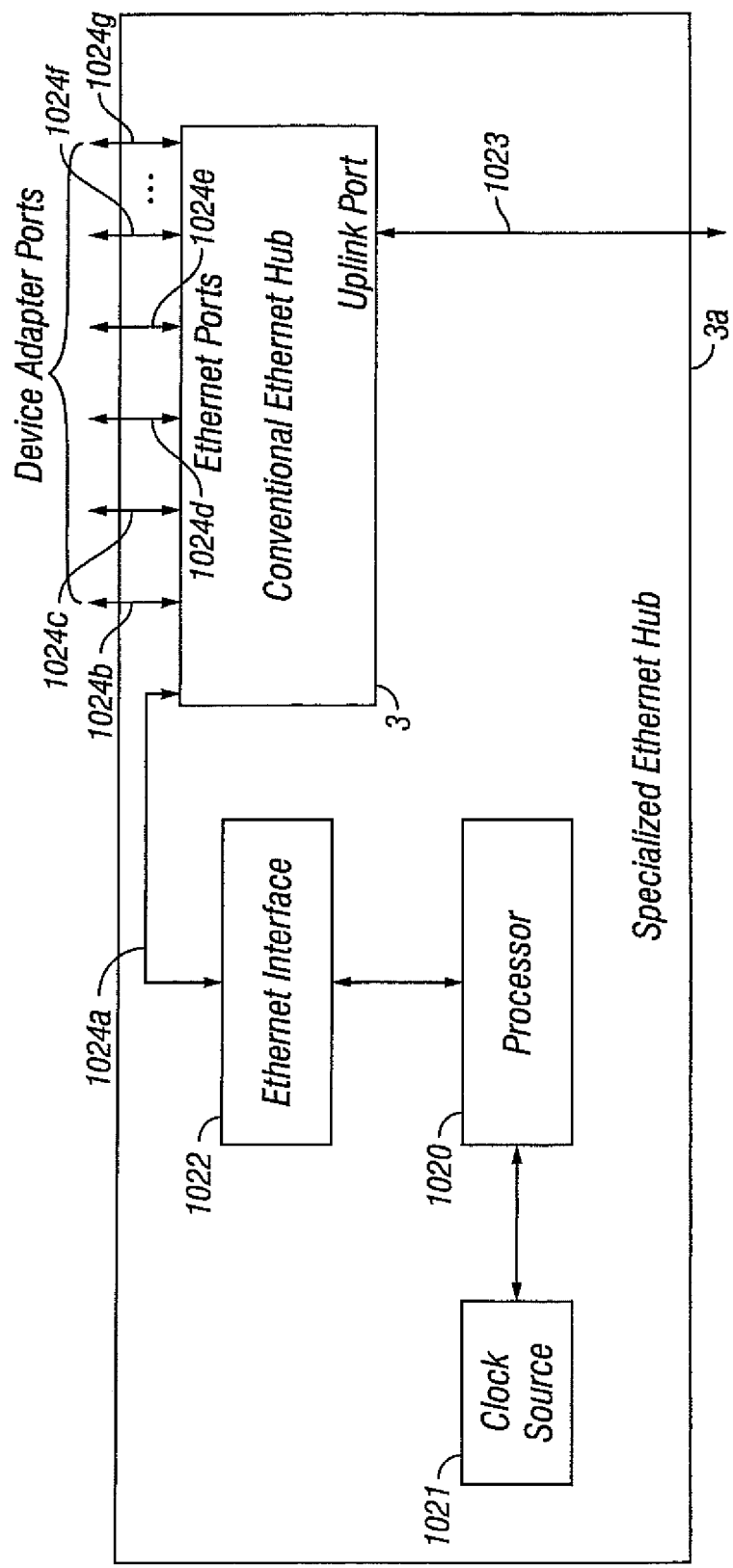
FIG. 6 is a block diagram of an exemplary specialized Ethernet repeater hub of the present invention, which repeater hub includes a means for generating and transmitting synchronization signals to the device adapters.

Alternatively, a specialized Ethernet repeater hub may be used to interconnect the device adapters, which may assert itself as the master timing device. A specialized Ethernet repeater hub may also assert itself as the master scheduling device. Referring to FIG. 6, a specialized Ethernet repeater hub 3a in accordance with the present invention is illustrated with a block diagram. Such a specialized Ethernet repeater hub 3a may be used in place of a standard Ethernet repeater hub 3 as in FIG. 2. As indicated in FIG. 6, a specialized Ethernet repeater hub 3a includes a standard Ethernet repeater hub 3, a processor 1020, an Ethernet interface 1022, and a clock source 1021. The processor 1020 may obtain a time reference from the clock source 1021 and use this to generate synchronization signals as discussed above. Such synchronization signals are sent as Ethernet packets to the Ethernet interface 1022, which is connected to an Ethernet port 1024*a* of the Ethernet repeater hub 3. Such synchronization signals are then delivered to device adapters 1000 which are attached to other Ethernet ports 1024*b*-1024*g* of the Ethernet repeater hub 3. The processor 1020 may communicate directly with device adapters 1000, in order to serve as a master scheduling device as described above. Specialized Ethernet repeater hubs 3*a* may be interconnected with other Ethernet repeater hubs using uplink ports 1023 to increase the number of device adapters that can attach to the network, which will become apparent to those skilled in the art.

In any case, upon selection, the master timing device sends two types of synchronization signals: a fine-resolution signal and a coarse-resolution signal. The fine-resolution signal is a frame-sync signal that may be a packet or any other reliable and precise signal source, either internal to or external from the network. It is not necessary for the fine-resolution frame,-sync signal to carry any explicit information because a key characteristic thereof is its time of arrival. It is preferable for the propagation time from the master device to the slave devices to have minimal jitter and uncertainty in arrival time.

The synchronization mechanism may also compensate for propagation delay across the network links. In one embodiment, the master timing device sends a signal to a device adapter and instructs the device adapter to return the signal to the master timing device. The master timing device may then measure the round trip delay, dividing this by two, to derive an estimate of the propagation delay from the device adapter to the master timing device. The master timing device may then send this estimate to said device adapter so that said device adapter can appropriately compensate for propagation delay. By repeating this process throughout the network, each device adapter may arrange for packets sent thereby to arrive at the Ethernet repeater hub at designated times relative to phase definitions within a frame. Alternatively, each slave device adapter may directly measure the propagation delay from a repeater hub thereto by sending a packet to itself by reflecting it off of the repeater hub. This technique allows each device adapter independently to measure and calibrate a synchronization offset.

It may not always be possible to directly measure the round-trip time to the source of the fine-resolution frame-sync signal, for example, when the source is external to the network. As discussed above, in a preferred embodiment, a specialized Ethernet repeater hub 3*a* of the present invention may connect device adapters of the present invention and provide the master timing source device. Time synchronization mismatches may be compensated by a one-way transmission from each source DA to the master device adapter during a sync calibration cycle at system initialization. In this embodiment, each device adapter acts 1000 as a slave device and transmits a sync verification signal to the specialized Ethernet repeater hub 3*a*. The specialized Ethernet repeater hub then measures the time offset between the clock of each slave device and its local (i.e., master) clock and sends a correction offset value back to the corresponding slave device. Thus, each slave device equalizes the phase delay from each slave device to the specialized Ethernet repeater hub 3*a* to facilitate precise coordination of TDM scheduled transmissions.

After phase alignment, any remaining phase mismatch between one DA and another is small relative to a packet length. The underlying CSAM/CD media access protocol self-corrects for any such remaining phase misalignments among the DAs. A phase misalignment may manifest itself as one DA attempting to transmit either too early or too late. If a DA transmits too early, then the carrier sense of CSMA/CD suspends or holds off a transmission by a current phase until the transmission of the previous phase completes, plus one IPG time. If a DA transmits too late, then wasted link capacity results for the idle gap because the previous phase may cause an overlap with a successive phase. If the misalignment causes a late transmission, a successive phase suspends or holds off transmission by virtue of CSMA/CD. In neither case does a collision occur, as the TDM scheduling only permits a single source to transmit in a single phase.

In particular, a DA begins a packet transmission such that the transmission would terminate at the end of the phase. However, phase misalignment and possible delays in the start of transmissions due to a carrier sense hold-off may cause a transmission to carry over to the successive phase. Therefore, according to an exemplary embodiment of the invention, the start of the last packet transmission in a first phase propagates across the network before the start of a second phase. This propagation takes place for the CMSA protocol, if necessary, to sense the transmission from the first phase and to hold off the start of the second phase. By this means, the time multiplexing of this invention self-aligns phase synchronization among all adjacent phases and thereby avoids collisions during the assigned phases.

The one-way transmission delay across an Ethernet network does not exceed 264 bit times and is typically less than 20 bit times for a simple star topology (for a background on such delay, see "The Evolving Ethernet," Alexis Ferrero, Addison Wesley, 1996, Chapter 10). Yet, a minimum sized Ethernet packet equals 512 bits plus a 64 bit preamble in length. Before accounting for CSMA hold-off from a prior phase to add to any clock misalignment, there is a margin of between one half to approximately the full duration of a minimum-sized packet with respect to the master clock for device adapters of this invention to operate and still avoid collisions during assigned phases. Thus, even after accounting for CSMA hold-off from a prior phase, or by simply extending the duration of a phase as compensation, device adapters of this invention can avoid collisions and guarantee transmission deadlines in the face of significant clock misalignment.

Turning to the coarse-resolution signal, the master timing source device broadcasts the coarse-resolution signal as a frame time-stamp packet on a periodic but infrequent basis. The frame time-stamp packet provides a coarse alignment of the current time. As the fine-resolution frame-sync signal has already established a precise synchronization of frame boundaries, the coarse-resolution frame time-stamp packet can now arrive at the DAs at any time within the same frame as its transmission.

Over time, the phase of the clocks of the slave devices may start to drift from that of the master device. The arrival of the fine-resolution sync signal realigns the phases. A measurement of the amount of phase drift and the inter-arrival time of the fine-resolution sync signal also compensates for clock frequency mismatches and thereby creates a frequency compensation factor. Crystal oscillators typically have a small frequency mismatch in accordance with manufacturing tolerances. Such mismatches, usually on the order of 100 parts per million (PPM), are adjustable with a variable crystal oscillator (VXO).

As mentioned above with reference to FIG. 3, according to an exemplary embodiment of the invention, clock 1010 may be a VXO utilized as the time source for each DA 1000. In such an embodiment, the master timing device does not adjust its frequency. However, each slave device uses the frequency compensation factor of the tine-resolution sync signal from the master device to adjust the frequency of the VXO of the slave device to match the frequency of the VXO of the master timing device. By compensating for slave/master frequency mismatches, the fine-resolution sync signal need only be broadcast at infrequent intervals. This contrasts with conventional techniques that rely upon a phase-locked-loop (PLL) having a voltage-controlled oscillator (VCO). Unlike a VXO, a VCO does not incorporate a crystal oscillator. In free-running mode, a VCO may have a high degree of drift and jitter. The PLL synchronization of the prior art relies upon a periodic beat packet arriving and mixing with a local VCO on each cycle of the oscillation to lock the frequency and the phase of the local clock to the arrival time of the beat packet. However, each beat packet is subject to uncertainties in interrupt processing and network transmission delays. These non-deterministic delays introduce random jitter to each local PLL VCO clock on a per-cycle basis. The resulting precise frequency synchronization of the present invention creates a highly stable network-wide time reference and greatly reduces clock jitter as compared to prior-art PLL/beat timing source approaches.

Annex Mode

Figure 7:
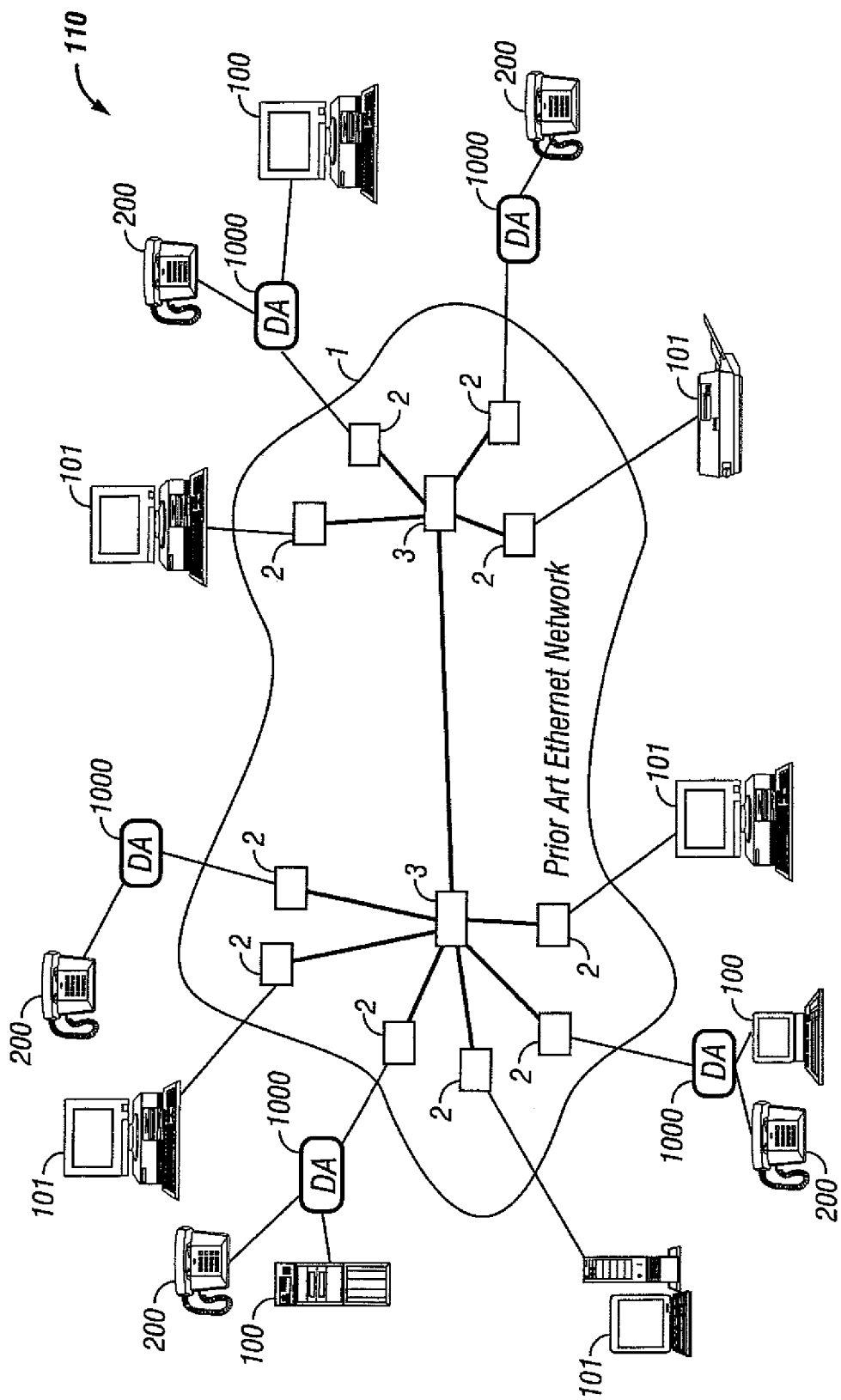
FIG. 7 is a schematic view of an exemplary Ethernet network in accordance with the present invention, particularly illustrating an Annex Mode of the network, in which real-time devices and conventional Ethernet devices are attached to the Ethernet network.

As mentioned above, in addition to Condition Mode, the network of the present invention operates in Annex Mode. With reference to FIG. 7, the network operates in Annex Mode when the device adapters 1000 of the invention coexist with prior art network interfaces called non-real-time devices (NRTDs) that are attached directly to the network medium 112 via network interface points 2, which devices are known as native NRTDs 101. The standard Ethernet repeater hubs 3 indicated in FIG. 7 may be replaced with specialized Ethernet repeater hubs 3a, in order to provide a master timing device and possibly a master scheduling device. As discussed in more detail below, in Annex Mode, when there is a surplus of time to meet deadlines, the transmission of real-time packets may be delayed in deference to non-real-time packets. However, collisions may be forced for non-real-time packets when a scheduled real-time packet may otherwise miss a deadline.

For example, a device adapter 1000 may determine whether there is sufficient time to transmit and deliver a real-time packet by a deadline. If so, the device adapter may defer transmission of the packet to allow a native NRTD to transmit non-real-time packets. If not, then the device adapter may become aggressive in attempting to meet a deadline. The device adapter may transmit the packet to force a collision with the native NRTD. Or it may ignore the normal 502.3 back-off algorithm and immediately retransmit after a collision without waiting. Alternatively, the device adapter may retransmit before waiting the fall interpacket gap time to usurp media access; that is, the device adapter may reduce the interpacket gap and then immediately retransmit the packet. Any combination of these techniques serve to increase the priority of a device of this invention with respect to a native NRTD to guarantee timely delivery of a real-time packet transmitted by a device adapter in contention with one or more native NRTDs.

Exemplary network 110 may include a plurality of NRTDs 101 connected directly to the Ethernet network 1 through network interface points 2. Real-time devices (RTDs) 200 may be attached to device adapters 1000, which in turn are connected to network interface points 2. The Annex Mode of operation of the network 110 is advantageous, as to support a conventional NRTD it is not necessary to connect the NRTD to a device adapter 1000, which means that a conventional Ethernet network can be upgraded incrementally as additional real-time devices are installed. As illustrated in FIG. 7, NRTDs 100 are preferably attached to device adapters 1000 as the device adapters 1000 may condition the traffic generated by NRTDs 100 to reduce collisions. An NRTD that is directly attached to a device adapter 1000 is considered a conditioned NRTD 100, and an NRTD that is directly attached to the conventional Ethernet network is a native NRTD 101.

A central issue with Annex Mode of the network is that the native NRTDs 101 may use a standard carrier sense multiple access collision detect (CSMA/CD) protocol and, hence, are not aware of any timing and packet-pacing mechanism used by the device adapter. The device adapters 1000 may support latency and throughput guarantees for real-time traffic by modifying the back-off protocol to ensure that packets from real-time traffic are delivered in a timely manner, which will be discussed in more detail below. However, as noted above, if a packet from a native NRTD 101 experiences several collisions, the latency suffered by the packet significantly increases as the average delay grows exponentially with the number of collisions.

An arbitration mechanism of the present invention may support a moderate traffic load from RTDs 200 without causing a significant increase in the average delay seen by native NRTDs 101, provided that the traffic load offered by the native NRTDs 101 is sufficiently low. It is preferable for native NRTDs 101 to back off after collisions only when necessary to meet deadlines of time-sensitive signals, or when congestion caused by other native RTDs 10 1 is present. As a native NRTD 101 does not know when real-time traffic is being transmitted, this is not possible. Instead, the operation of the device adapters 1000 in Annex Mode prevents unnecessary collisions between device adapters 1000 and native NRTDs 101. The device adapters 1000 accomplish this goal by deferring to native NRTD 101 traffic when possible.

Figure 8:
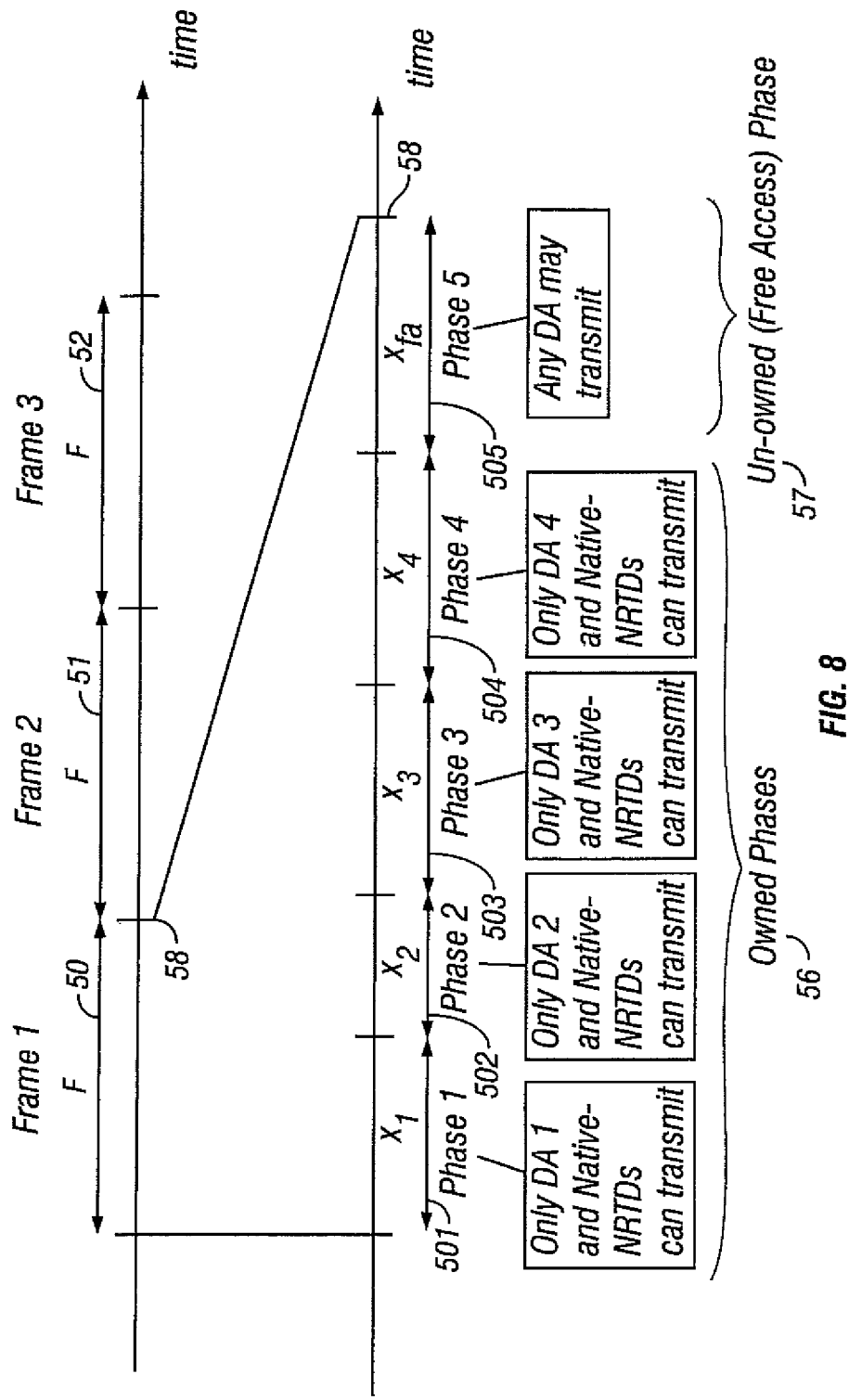
FIG. 8 is a graphical view illustrating the organization of time into repeating frames and time intervals within each frame that define allowable phases for each device to transmit time-sensitive traffic (Annex Mode)

The arbitration mechanism of the device adapters under Annex Mode will now be described with reference to FIG. 8. As mentioned above, a common time reference is obtained by the device adapters. Time is divided into equal length frames of duration F, and frame boundaries occur at times t=nF relative to the common time reference, where n is an integer. Continuing the exemplary number of device adapters for this description, it is assumed that there are four device adapters 1000 (i.e., N=4). Each frame is divided into N+1 non-overlapping intervals or phases, which are labeled p=1, 2, 3, . . . N+1. Three frames 50, 51, and 52 are shown, and five phases 501, 502, 503, 504, and 505 for frame 50 are shown. The first N phases are owned by respective device adapters 1000, as indicated by numeral 56. That is, if p satisfies 1≤p≤N, then phase p is owned by DAp. A device adapter is not allowed to transmit in any owned phase except for the phase that its own. However, as native NRTDs 101 are oblivious to the framing structure, it is possible that native NRTDs 101 will attempt to transmit a packet at any time during a frame.

Analogous to the discussion above, phase N+1 is unowned, as indicated by numeral 57, is considered as a free-access phase, allowing any device adapter 1000 to transmit during this last phase of a frame. The CSMA/CD protocol may be used during the free-access phase 57, and, therefore, collisions may occur during the free-access phase 57. Each device adapter 1000 transmitting a packet during the free-access phase 57 does so without crossing the frame boundary 58. Thus, towards the end of the free-access phase 57, a device adapter 1000 may have to refrain from transmitting a packet.

Note that as native NRTDs 101 can transmit a packet at any time, a packet transmission from a native NRTD 101 may cross a frame boundary 58.

The length of the phases 501-505 may vary in each frame 50-52. At the beginning of a frame with P owned phases, there are P numbers $Y_1, Y_2, \ldots Y_P$ known to the device adapters, such that $0<Y_1<Y_2<\ldots<Y_P\leq F$. The interpretation of these numbers is that if a frame begins at time t, then phase p of that frame ends at time $t+Y_p$. Letting $x_1, x_2, \ldots x_P$ denote the lengths of phases 1, 2, 3, ... P, in this frame, respectively, then $x_1+x_2+\ldots x_p=Y_p$ for all p satisfying $1\leq p\leq P$. As discussed above before, as the length of each frame is the constant F, the length of the free-access phase is $x_{fa}=F-(x_1+x_2+\ldots +x_P)$. In FIG. 8, it is assumed that P=for simplicity.

Figure 9A:
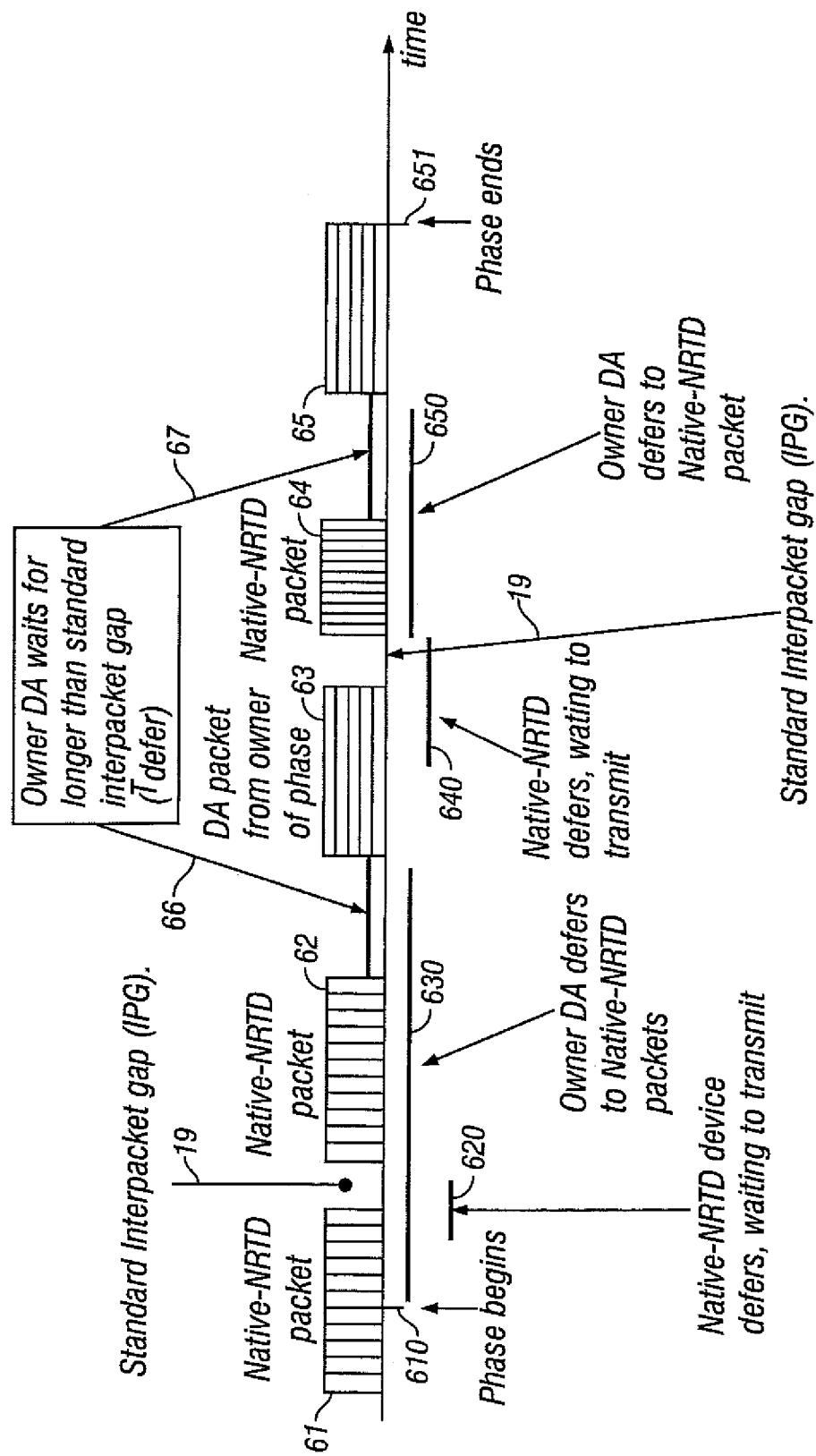
FIGS. 9a and 9b are graphical views illustrating respective exemplary arbitration mechanisms of the present invention in Annex Mode.
Figure 9B:
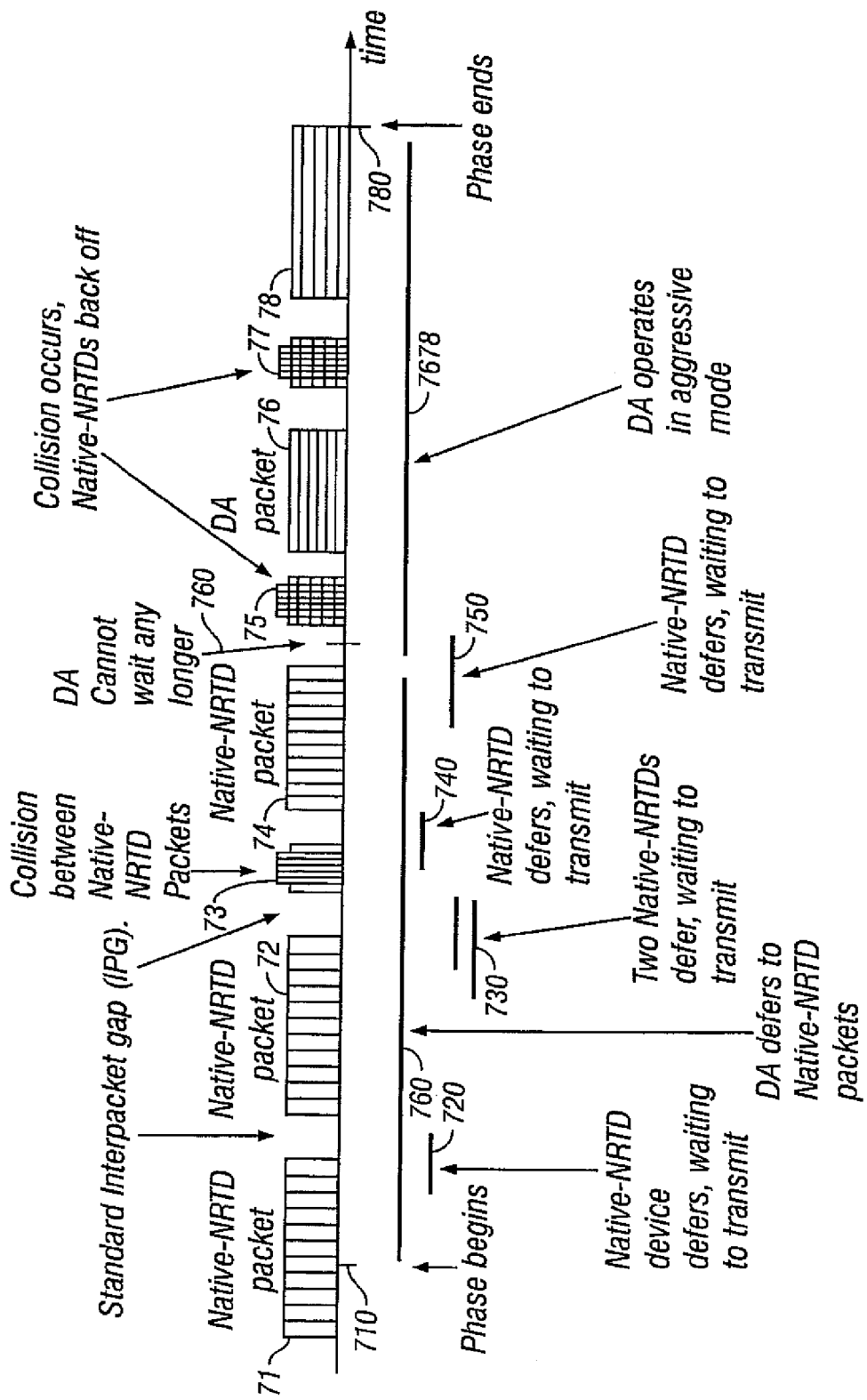

Exemplary arbitration mechanism utilized by the device adapters 1000 in Annex Mode are illustrated in FIG. 9a and FIG. 9b. As mentioned above, a device adapter 1000 may only transmit packets during the phase it owns or during a free-access phase. Thus, during phase p, the only devices that may transmit a packet are native NRTDs 101 and Dap. Also mentioned above, native NRTDs 101 may use a CSAM/CD protocol. A native NRTD 101 that is deferring transmission of a packet will typically wait only IPG 19 seconds after sensing the network is idle before transmitting a packet, because if it were to wait longer, it would be at a disadvantage relative to other devices implementing the CSMA/CD protocol. As collisions are most likely to occur after the network becomes idle, a device adapter 1000 can avoid a collision with a native NRTD 101 by waiting for a time longer than the IPG 19, namely, a defer time $T_{defer}$ 190 after sensing the network becomes idle before starting to transmit a packet. This gives native NRTDs the first opportunity to use the network when the state of the network becomes idle, as shown illustrated FIG. 9a as the possible timing of events during an owned phase.

In this example, the transmission interval of a packet 61 transmitted by a native NRTD 101 crosses the boundary 610 that defines the beginning of the phase. The DA 1000 which owns the phase has a packet 63 ready to transmit at the beginning of the phase 610, but defers (as indicated by numeral 630) to two packet transmissions 61 and 62 from native NRTDs 101 by waiting until it senses that the network is idle for a duration of at least $T_{defer}$ seconds. More specifically, a native NRTD 101 may attempt to transmit a packet 62 during the transmission of packet 61, but as native NRTDs follow the CSMA/CD protocol and the network is sensed busy, the native NRTD defers (as indicated by numeral 620) the transmission until the channel is sensed idle for at least one IPG 19.

As the value of an inter-packet gap (IPG) 19 is less than $T_{defer}$, a native NRTD is able to begin the transmission of its packet 62 before the owner of the phase. In this example, the owner of the phase is first able to transmit packet 63 after $T_{defer}$ seconds (indicated by numeral 66) following the end of the transmission of packet 62. In this example, after the owner of the phase transmits packet 63, the phase owner has another packet 65 ready to transmit. Similar to above, another native NRTD 101 transmits packet 64 after deferring (indicated by numeral 640) to packet 63 by waiting for at least IPG 19 seconds of idleness. Packet 65 is not transmitted until $T_{defer}$ seconds (indicated by numeral 67) after the end of the transmission of packet 64.

When a real-time packet needs to be transmitted in order to meet a deadline, a device adapter 1000 may operate in a "aggressive mode," whereby the device adapter waits for an inter-packet gap after sensing the network becomes idle before transmitting a packet. In addition, if a device adapter is involved in a collision while in the aggressive mode, the device adapter will not back off after the collision. As native NRTDs 101 are required to back off after collisions according to conventional CSMA/CD protocol, a device adapter 100 of the present invention operating in the aggressive mode can effectively monopolize the network, transmitting real-time traffic as necessary to meet deadlines. A device adapter 1000 will preferably operate in the aggressive mode only if the device adapter would otherwise be in danger of delivering real-time traffic later than required. In view of the foregoing, a device adapter 1000 attempts to minimize the chances of collision with native NRTDs 101 during the phase it owns. But when a particular device adapter is otherwise in danger of transmitting packets later than their deadlines, the device adapter may enter the aggressive mode.

An alternative approach for a device adapter operating in aggressive mode is to intentionally cause collisions with native NRTDs 101 without waiting for packet transmissions to end. FIG. 9b illustrates such an example of the aggressive mode, illustrating a possible sequence of events during an owned phase. The first portion of the phase operates in a similar manner to that depicted in FIG. 9a in that the transmission of a packet 61 from a native NRTD 101 overlaps with the boundary 610 that defines the beginning of the owned phase. Referring to FIG. 9b, at the beginning of the phase, the device adapter 1000 which owns the phase has two packets 76 and 78 to transmit during the phase. However, as the phase owner is initially not in aggressive mode, the owner waits until at least $T_{defer}$ seconds of idleness are sensed on the network before beginning the transmission of a packet. Thus, a packet 72 from a native NRTD 101 is able to transmit a packet 72 after deferring (indicated by numeral 720) to packet 71, and a packet 74 from a Native 10 NRTD 101 is transmitted after deferring (indicated by numeral 740) in the midst of a collision 73 that occurs between native NRTDs 101 after the transmission of packet 72, due to simultaneous deference (indicated by numeral 730).

After transmission of packet 74, the owner of the phase determines that it cannot wait any longer 760 to transmit packets 76 and 78, and, therefore, enters the aggressive mode (indicated by numeral 7678). In this example, a native NRTD 101 defers (indicated by numeral 750) a transmission until IPG seconds after packet 74. As the owner has entered aggressive mode at this time, the owner also has the right to transmit IPG seconds after packet 74 ends transmission; and in this example a collision 75 occurs. After this collision, the native NRTD 101 backs off while the owner does not back off. Therefore, the owner is able to transmit packet 76 immediately after the collision. After the transmission of packet 76 by the owner, the owner attempts to transmit packet 78, but a collision 77 occurs with a native NRTD 101 which was deferring to packet 76. The owner. does not back off after this collision 77 and is able to successfully transmit packet 78 immediately after the collision.

Preferred Embodiment for Transmission Processing

Figure 10A:
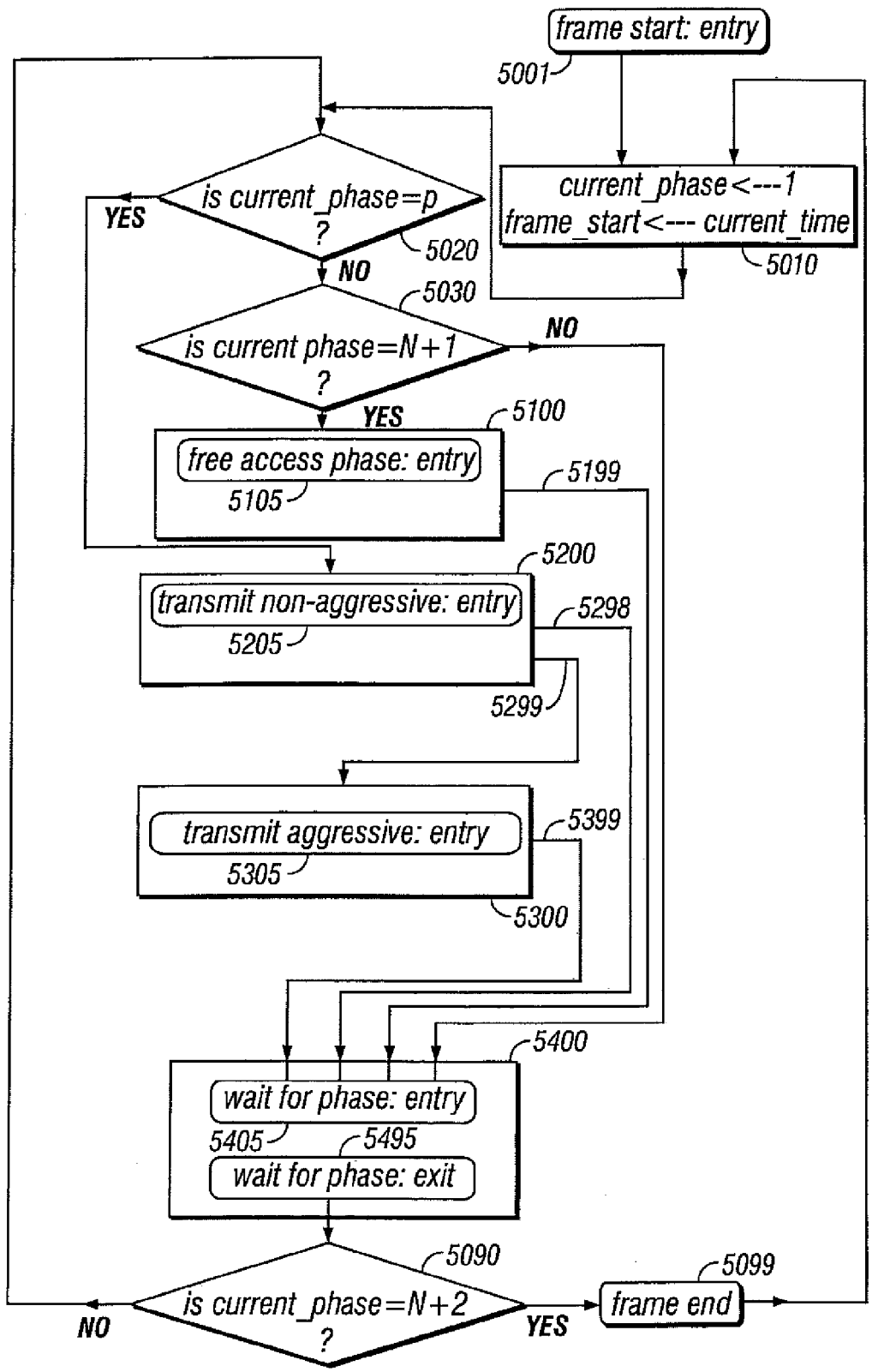
FIGS. 10a, 10b, 10c, 10d, 10e, and 10f are flowcharts illustrating respective exemplary embodiments for packet transmission procedures for a Device Adapter of the present invention, covering both Conditioned Mode and Annex Mode.

A preferred embodiment for managing packet transmissions by a particular device adapter 1000 is described hierarchically in the flowcharts illustrated in FIG. 10a-10f. It is assumed that there are a total of N device adapters 1000 in the network, and each device adapter 1000 is assigned a unique integer address q in the range $1\leq q\leq N$. It is also assumed that each device adapter has an address p. The overall processing flow for a device adapter is illustrated in FIG. 10a. Those skilled in the art will understand that the flowcharts of FIGS. 10a-10f are for illustrated purposes and that there are multiples of functionally equivalent hardware and software implementations thereof.

The processing disclosed in FIGS. 10a-10f handles both the Annex and Conditioned modes of the invention. Description of the network operating under Annex mode will be provided initially. As discussed in more detail below, the network operating under Conditioned mode can be achieved by modification of a single parameter.

A frame begins at time t=nF, relative to the common time reference in the local network, where F is the frame length and n is an integer. A variable curren_-time is defined to hold the estimate of the common time reference of the device adapters, Thus, current_time increases at rate of real time, and the value of current_time across different device adapters 1000 is synchronized to within a small error. For purposes of this description, timing errors are ignored in FIGS. 10a-10f, with modifications to accommodate timing errors later being discussed below. As mentioned above, if a frame starts at time t, then phase q within that frame ends at time $t+Y_q$.

Transmission Processing Overview

Referring to FIG. 10a, at the beginning of a frame 5001 the processing moves to block 5010, wherein a counter named current_phase is initialized to 1, and a variable named frame_start is loaded with the value current_time. The value of frame_start thus holds the time at which the current frame began. The value of current_phase represents the index of the phase within a frame and is incremented accordingly as the various phases within a frame progress. From block 5010, the processing moves to decision block 5020.

Within decision block 5020, the value of current_phase is compared to the device adapter address p. If the quantities are not equal, the processing moves to decision block 5030, where the value of current_phase is compared to N+1. In this case, if the current_phase is not equal to N+1, then this indicates that the system is in an owned phase owned by another device adapter. Accordingly, in this case, the processing proceeds to the entry point 5405 of processing block 5400. The basic function of block 5400 is to silently wait for the end of the current phase. When the end of the current phase is reached, current_phase is incremented by 1 within the block 5400, and the exit point 5495 is reached The details of processing block 5400 will be described in more detail below.

Referring back to decision block 5030, if current_phase=N+1, then this indicates that the system is in the free-access phase, and the processing accordingly moves to the entry point 5105 of processing block 5100. The function of processing block 5100, which will be described in detail later, is to manage packet transmissions according to standard Ethernet CSMA/CD protocol while inhibiting transmissions at the end of the free-access phase, at which time the processing leaves block 5100 through transition 5199 to the entry point 5405 of the processing block 5400. In this case, within block 5400, the device adapter waits for the free-access phase to end, increments current_phase, and exits at point 5495.

Referring back to decision block 5020, if current_phase=p, then this indicates that the beginning of phase p, which is owned by the device adapter, has started. Accordingly, the processing moves to the entry point 5205 of processing block 5200. The function of the processing block 5100, which is also described in more detail below, is to transmit packets during the phase owned by the device adapter. The transmissions within block 5100 will be done in a non-aggressive mode, deferring to native device adapters by using a longer inter-packet gap. If the device adapter is able to transmit the required number of real-time packets before the time that phase p ends, namely, at time $t+Y_P$, then the device adapter may transmit any queued non-real-time packets until the phase end time. At phase end, it then leaves the processing block 5200 through the normal exit point 5295.

If the device adapter has no packets to transmit during phase p, the processing moves through transition 5298 to the entry point 5405 of processing block 5400. In this case, within block 5400 the device adapter remains silent which signals the end of phase p, increments current_phase, and exits at point 5495.

If, during the course of phase p, the device adapter would otherwise be in danger of not being able to transmit real-time packets before their deadlines, the processing moves through transition 5299 to the entry point 5305 of processing block 5300. The function of processing block 5300 is to transmit packets during the phase owned by the device adapter operating in the aggressive mode. When the required number of real-time packets have been transmitted during phase p, the device adapter terminates aggressive mode and leaves the processing block 5300 through the normal exit point 5395.

Under nominal operating conditions, a particular device adapter will be able to send all the required packets during phase p. However, as a safety measure, the processing may move through transition 5399 to the entry point 5405 of processing block 5400. In this case, the processing within block terminates phase p at the required time and current_phase is incremented by 1 before moving to the exit point 5495 of processing block 5400.

After the termination of a phase, at exit points 5295 or 5395, the processing moves to the decision block 5020 again, so that the next phase within the frame can be processed. After termination of a phase at point 5395, the processing moves to decision block 5090. Within decision, block 5090, the value of current_phase is compared to N+2. If current_phase=N+2, this indicates the end of a free-access phase, which is the last phase of a frame. The reason that current_phase=N+2 in this case is that current_phase is incremented from its value of N+1 within processing block 5400. Accordingly, if current_phase=N+2 within block 5090, then the processing moves through point 5099, indicating the end of a frame, to point 5010 where current_phase is reinitialized to 1 and the frame processing repeats for the next frame. If current_phase is not equal to N+1 within decision block 5090, then the processing moves to decision block 5020 so that the next phase within the current frame can be processed.

Block 5400: Waiting for Phase to End

Figure 10B:
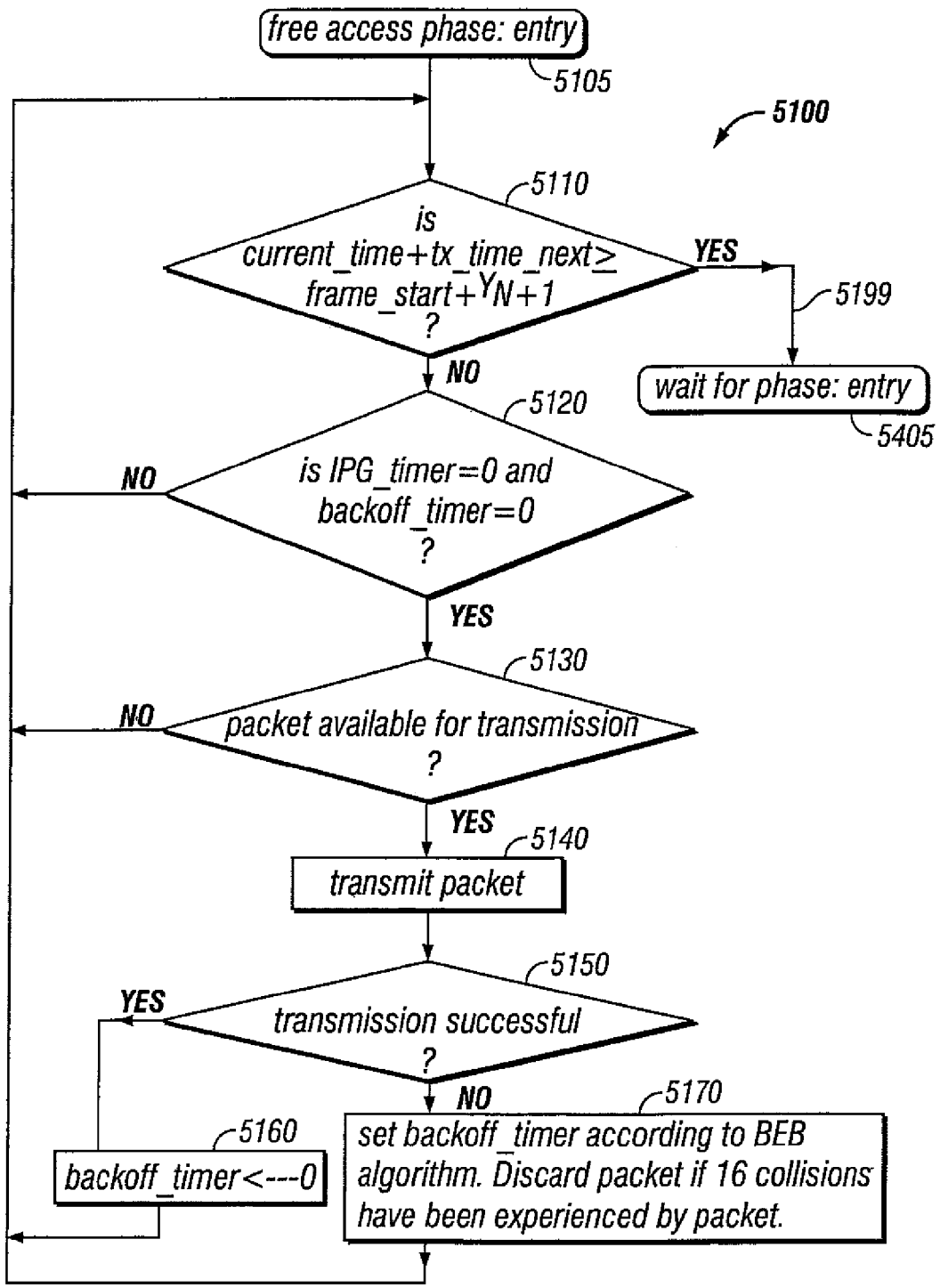
Figure 10C:
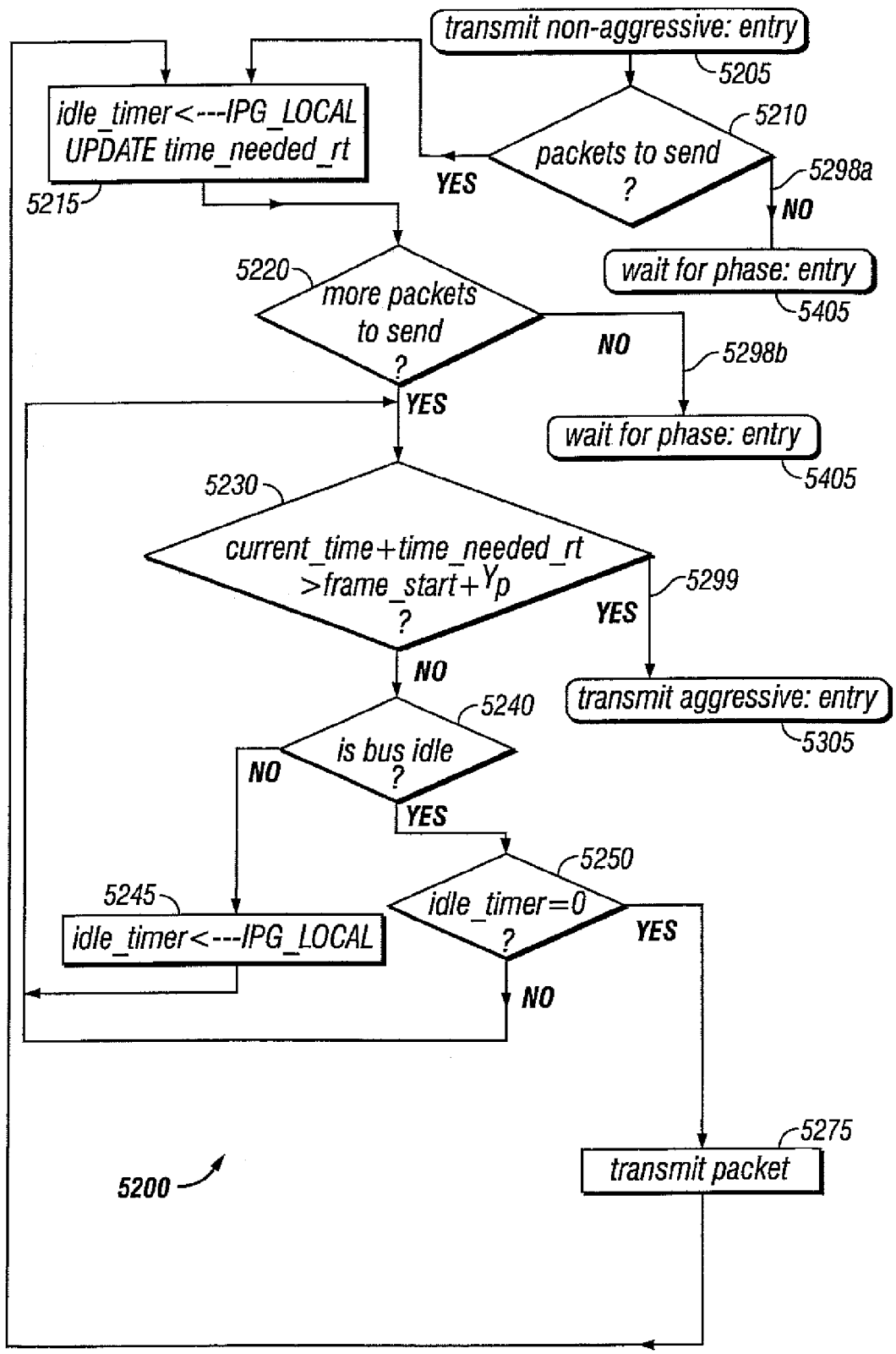
Figure 10D:
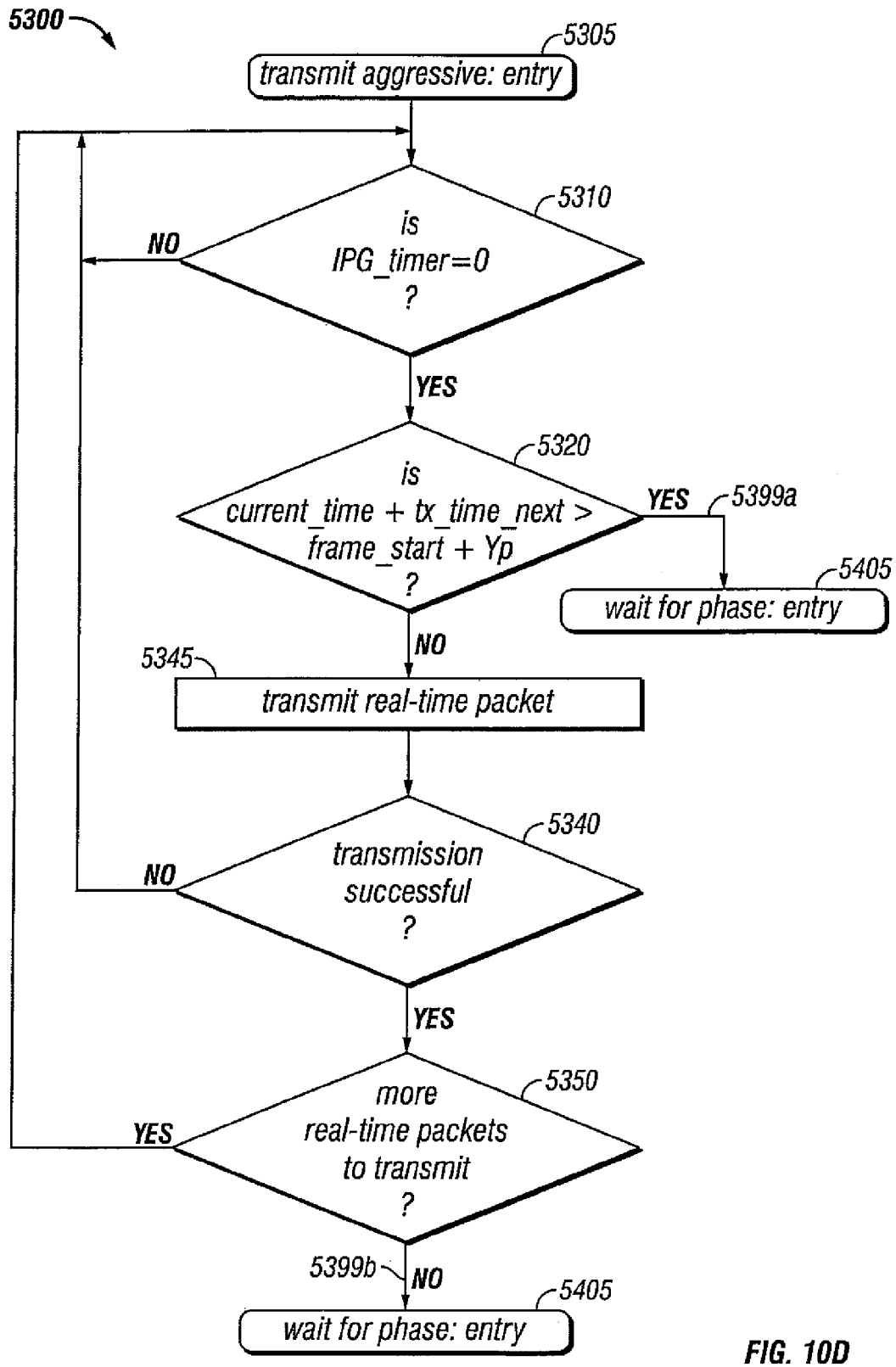
Figure 10E:
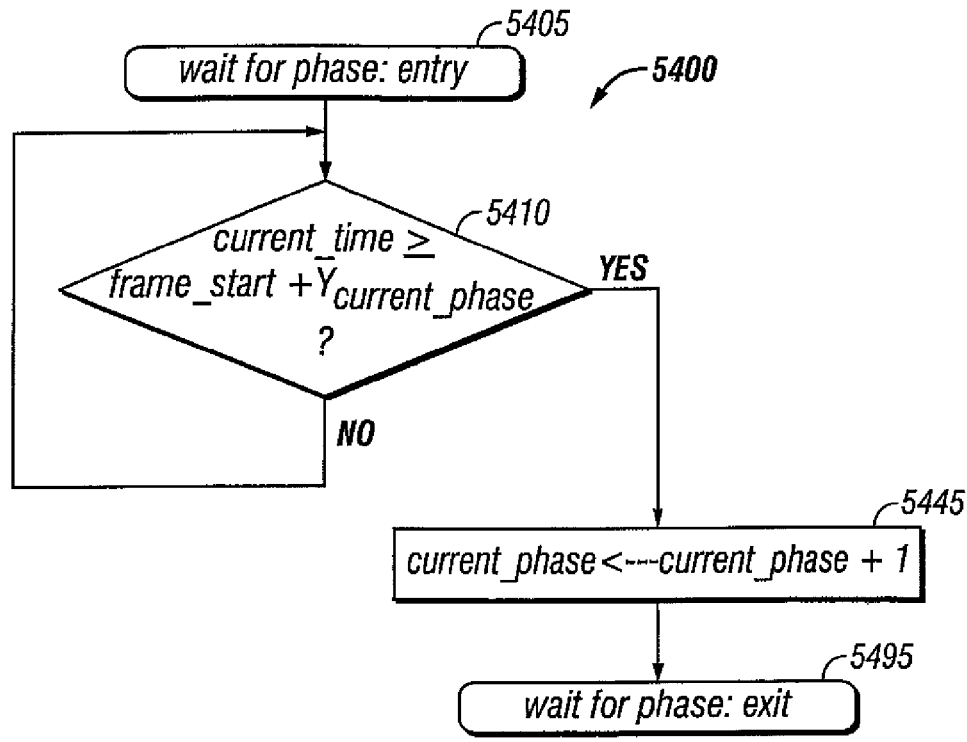

Turning to the description of processing block 5400, reference is made to FIG. 10e. As mentioned above, the function of block 5400 is to determine when the end of the current phase occurs, and increment current_phase by 1 when the phase transition occurs. From the entry point of the block 5405, the processing moves to decision block 5410 wherein the value of current_time is compared to the sum of frame_start and $Y_{current\_phase}$. As mentioned above, by definition if a frame starts at time t, then phase q within that frame ends at time $t+Y_q$. The purpose of the decision block 5410 is therefore when the current phase ends. Accordingly, if current_-time is greater than or equal to the sum of frame_start and $Y_{current\_phase}$, then the current phase terminates and the processing moves from 5410 to 5445, where the variable current_phase is incremented by 1. If current_time is less than the sum of frame_start and $Y_{current\_phase}$, then the phase continues until time frame_start+$Y_{current\_phase}$. Accordingly, the processing repeatedly reenter decision block 5410 until such time the processing moves to block 5445.

Block 5200: Transmission of Packets During Owned Phase Non-aggressively

Reference is made to FIG. 10c for discussion of the processing within block 5200. As mentioned above, the function of block 5200 is to manage the transmission of packets during the phase that a particular device adapter owns. From the entry point 5205, the processing moves to decision block 5210, wherein it is determined whether the particular device adapter has any packets to be sent during phase p which it owns. If not, the processing moves through transition 5298 to the entry point 5405 of processing block 5400, wherein the phase is terminated at the appropriate time as described above. If the particular device adapter has packets to transmit during phase p, the processing moves to block 5215. Within block 5215, the timer idle_timer is set to the parameter IPG_LOCAL. Once set to a positive value, idle_timer decrements at the rate of real time until it reaches zero, at which time idle_timer retains the value zero until reset again. The parameter IPG_LOCAL is equal to a value longer than the standard interpacket gap IPG. Within block 5200, the device adapter attempts to avoid collisions with native NRTDs by waiting until the bus is sensed idle for IPG_LOCAL seconds.

Also within block 5215, a variable time_needed_rt is updated. The value of time_needed_rt may be set equal to the maximum time it would take the device adapter to successfully transmit all the remaining real-time packets that are required to be sent during the current phase, assuming that the device adapter does so in the aggressive mode. Thus, this includes transmission times of such packets, as well as the maximum time wasted during collisions with native NRTDs, which collisions are required to cause the native NRTDs to back off and remain silent. The specification of the maximum time required by the device adapter to transmit the remaining real-time packets in the aggressive mode may be selected in accordance with a particular network implementation. The variable time_needed_rt is updated so that it can later be determined if the device adapter should enter the aggressive mode.

Upon leaving block 5215, the processing moves to decision block 5220, wherein the device adapter determines whether to send any more packets within the current phase p. This includes real-time packets as well as non-real-time packets. If not, the processing moves to the entry point 5405 of processing block 5400, wherein the phase is terminated at the appropriate time as described above. If within decision block 5220 it is determined that the device adapter wishes to transmit more packets during the current phase p, the processing moves to decision block 5230.

The processing may traverse the cycle of blocks 5230, 5240, 5245, and 5230, or may traverse the cycle of blocks 5230, 5240, 5250, and 5220 until the time that the device adapter observers at least IPG_LOCAL seconds of silence on the bus, or the time it must enter the aggressive mode. Specifically, within block 5230 the sum of current_time and time_needed_rt is compared to the time when phase p must end by, namely, frame_start+$Y_P$. If current_time+time_needed_rt is greater than frame_start+$Y_P$, then the device adapter enters the aggressive mode, and the processing moves through transition 5299 to the entry point 5305 of process block 5300. If, on the other hand, current_time+time_needed_rt is less than or equal to frame_start+$Y_P$, then the device adapter can still attempt to transmit packets in the non-aggressive mode. Accordingly in this case, the processing moves to decision block 5240, wherein the device adapter checks the state of the bus. If the bus is not idle, the processing moves to 5245 where idle_timer is reset to IPG_LOCAL, and the processing loops back to decision block 5230. If the bus is idle within block 5240, then the processing moves to block 5250, where the value of idle_timer is compared with zero. If idle_timer is not equal to zero, then this indicates that the device adapter has not yet observed IPG_LOCAL contiguous. seconds of silence, and the processing loops back to decision block 5230. If idle_ timer is equal to zero within block 5250, then this indicates that the device adapter has observed IPG_LOCAL contiguous seconds of silence, and that the device adapter is now enabled to send packets. Accordingly, in this case the processing moves to block 5275, wherein a packet is transmitted.

If the device adapter has real-time packets to transmit, the device adapter will attempt to transmit such packets before attempting to transmit any of the non-real-time packets it may have to transmit.

After transmitting a packet in block 5275, the processing loops back to block 5215 in order to possibly transmit more packets, Aver the start of the packet transmission in block 5275, there are two possibilities. First, it is possible that the transmission collides with that of a native NRTD. In this case, the transmission is aborted after the collision is detected, and the device adapter transmits a jam signal so that all stations can reliably determine that a collision occurred. As the transmission is aborted, the value of time_needed_rt will not change in block 5215. If the transmission by the device adapter in block 5275 is successful, then if it was a real-time packet, the variable time_needed_rt is decremented in block 5215.

Block 5500: Management of Interpacket Gap Timer

Figure 10F:
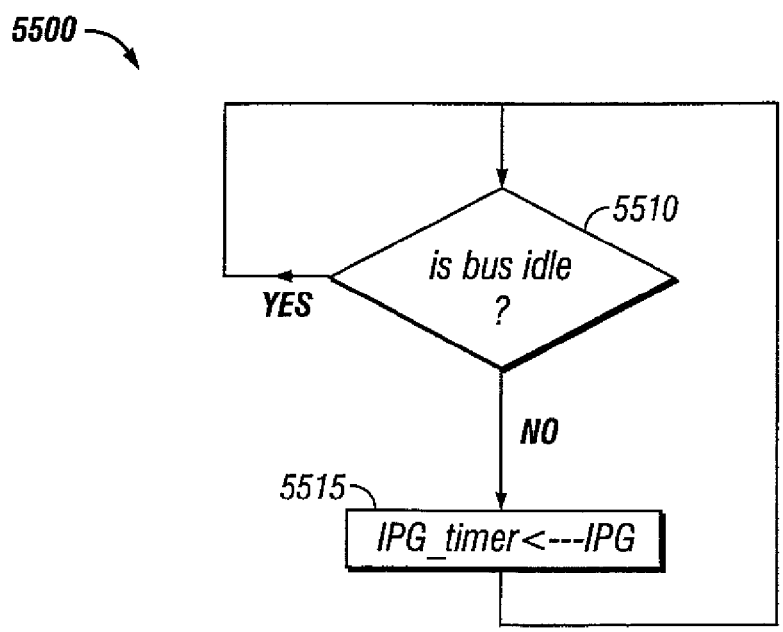

FIG. 10*f* illustrates a process which runs on a device adapter runs on DA concurrently with the main process described in FIGS. 10*a*-10*e*. The purpose of the process is to maintain a timer variable named IPG_timer. As indicated in the figure, the state of the bus is continuously monitored in decision block 5510. Whenever activity is sensed on the bus, the timer_IPG timer is set to a predetermined interpacket gap (IPG), which may be the value of the standard interpacket gap in the Ethernet access protocol. While positive, the value of IPG_timer is decremented at the rate of real-time until a value of zero is reached. Once zero is reached, IPG_timer remains constant until reset to a positive value. Thus, if IPG_timer equals zero at any point in time, then this indicates that the device adapter has observed silence for at least the past IPG seconds relative to the current time.

Block 5300: Transmission of Real-Time Packets in Aggressive Mode

The process block 5300 is described with reference to FIG. 10*d*. As mentioned above, the function of block 5300 is to control the timing of the transmission of real-time packets by the device adapter in the aggressive mode during phase p. Upon entering the block through entry point 5305, the processing begins at decision block 5310, where the value of IPG_timer is compared with zero. If IPG_timer is not equal to zero, then the processing loops back to decision block 5310. The processing does not break from decision block until IPG_timer is equal to zero. When IPG_timer is equal to zero, this indicates that IPG seconds of silence have elapsed, and accordingly a packet transmission can start. Accordingly, in this case the processing moves to block 5320.

Within decision block 5320, a variable tx_time_next is referenced. This variable holds the transmission time of the next real-time packet to be transmitted during the current phase. The sum of current_time and tx_time_next is compared to frame_start+$Y_p$. If current_time+tx_time_next is greater than frame_start+$Y_p$, then transmission of the next real-time packet that requires transmission in the current phase would cause the duration of phase to extend beyond time t+$Y_p$, which violates the constraint on the ending time of phase p. Accordingly, in this case, the processing moves through transition 5399 to the entry point 5405 of block 5400, so that the current phase will terminate as required. The transition 5399 is included as a safety valve to ensure that phase p terminates by the required time and will not be traversed under nominal conditions. If current_time+tx_time_next is less than or equal to frame_start+$Y_p$, then there is sufficient time to transmit the next real-time packet within the current phase p, and the processing moves to Block 5345, wherein a real time packet is transmitted.

After the packet has begun transmission in 5345, the processing moves to decision block 5340. There are two possibilities for the fate of the packet transmission. If a collision occurs. the transmission is aborted as soon as the collision is detected, and a JAM signal is sent, as in standard Ethernet access protocol. In this case, the processing moves from 5340 back to decision block 5310, so that the packet can be retransmitted. The device adapter does not back off after a collision but instead may try to transmit after waiting only for the bus to remain silent for the standard interpacket gap IPG. If the transmission in block 5345 completes successfully, then the processing moves from block 5340 to decision block 5350.

Within decision block 5350, the device adapter determines whether there are more real-time packets remaining to be transmitted during the current phase p. If so, the processing loops back to decision block 5310, so that the remaining real-time packets may be transmitted. If not the processing proceeds to the entry point 5405 of block 5400, so that the current phase will terminate as required.

Block 5 100: Transmission of Packets in Free-Access Phase

Referencing FIG. 10*b*, an exemplary implementation of process block 5100 is illustrated. As mentioned above, the function of block 5100 is to transmit packets during the free-access 25 phase according to standard CSMA/CD protocol of Ethernet, while inhibiting transmissions at the end of the phase. The processing enters decision block 5110 after passing through the entry point 5105.

Within decision block 5110, a variable tx_time_next is referenced. This variable holds the transmission time of the next packet to be transmitted during the current phase, and is equal to zero if there is no packet currently queued. The sum of current_time and tx_time_next is compared to frame_start+$Y_{N+1}$. As described above, the free-access phase within the current frame ends at time frame_start+$Y_{N+1}$. Accordingly, if current_time+tx_time_next is greater than or equal to frame_start+$Y_{N+1}$, then the next packet cannot be successfully transmitted within the current free access phase, and the processing moves through transition 5199 to the entry point 5405 of block 5400, where the free-access phase will be terminated as appropriate. If current_time+tx_time_next is less frame_start+$Y_{N+1}$, then the processing moves to decision block 5120.

Once the processing moves to decision block 5120, it is allowable for the device adapter to attempt transmission of a packet. However, it must wait for at least IPG seconds of silence before doing so, and back off from any previous collisions that may have already been suffered by the packet. Accordingly, within decision block 5120, the device adapter tests to determine whether IPG_timer is equal to zero and backoff_timer is equal to zero. If so, the device adapter has observed IPG seconds of silence and is through backing off from any previous collisions that may have occurred, and thus proceeds to decision block 5130. If not, the processing loops back to decision block 5110.

Within decision block 5130, the device adapter determines whether there is a pack: et waiting to be transmitted. If not, the processing loops back to decision block 5110. If so, the processing moves to 5140 and the packet is transmitted.

After the packet has begun transmission in block 5140, the processing moves to decision block 5150. There are two possibilities for the fate of the packet transmission, If a collision occurs, the transmission is aborted as soon as the collision is detected, and a JAM signal is sent, as in the standard Ethernet access protocol. In this case the processing moves from 5150 to block 5170. Within block 5170, the timer backoff_timer is set to a random retransmission delay as in the standard truncated binary exponential back-off algorithm within the Ethernet protocol. In particular, if a packet has experienced k collisions, then backoff_timer is set to iT, where T is the slot time and i is a random integer in the range $0 \le i < 2^m$ and m=min {k,10}. After a packet has experienced 16 collisions, the packet is discarded. Note that as long as the timer backoff_timer remains positive, backoff_timer decrements at the rate of real time until it reaches zero. When zero is readied, backoff_timer retains the value of zero until reset to a positive value. Thus, when backoff_timer=0, the device adapter is through backing off from any previous collisions that may have occurred. If the transmission in block 5140 was successful, then the processing moves from block 5140 to block 5160, where the backoff_timer is set to zero. From either block 5160 or block 5170, the processing loops back to decision block 5110 so that the next transmission or retransmission can proceed if possible within the free-access phase.

During the free-access phase, it may be preferable for the device adapter 1000 to use a longer interpacket gap, IPG_LOCAL, in order to avoid collisions with other device adapters 1000 and native NRTDs, thereby surrendering priority to native NRTDs. The necessary modifications to process block 5100 in order to implement this will be apparent to someone skilled in the art.

Transmission Processing for Conditioned Mode

If the network is configured in Conditioned mode rather than Annex mode, then no collisions are possible during owned phases, so that it is unnecessary for a particular device adapters to defer by using a longer interpacket gap within the phase p that it owns. In this case, the processing can be optimized by setting the parameter IPG_LOCAL, defined within processing block 5200, to the standard interpacket gap IPG. In the conditioned mode, the process block 5300 will not be entered under nominal conditions. Preferably, a device adapter 1000 can automatically detect whether or not the network is configured in Conditioned mode or Annex mode by detecting collisions during owned phases, for example, and set the value of IPG_LOCAL accordingly.

Universal Ethernet Repeater Hub with Prior Art Ethernet Ports

Figure 11:
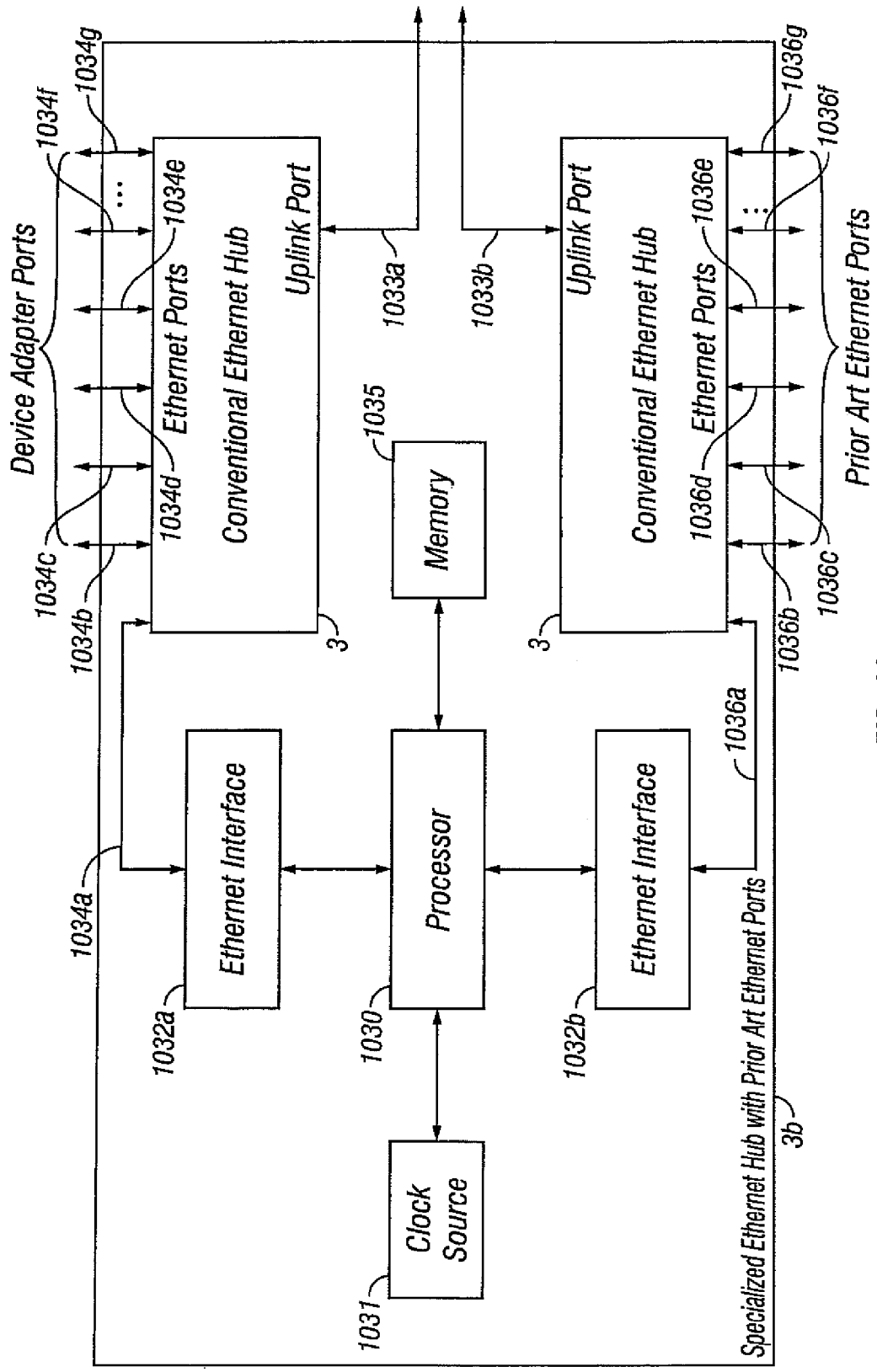
FIG. 11 is a block diagram of a specialized Ethernet repeater hub incorporating a master timing source and as ports for prior art Ethernet devices.

In addition to the Annex mode described above, the present invention provides alternative methods and apparatus for configuring both real-time devices (RTDs) 200 and non-real-time device (NRTDs) 100 that are connected to a device adapter (DA) 1000 (see FIG. 7) with conventional non-real-time devices (NRTDs) 101 into a network. In this regard, an exemplary embodiment of a universal Ethernet repeater hub 3*b* with prior art Ethernet ports in accordance with the present invention is illustrated in FIG. 11. Exemplary universal repeater hub 3*b*, which may function as either a master timing device or a master scheduling device, eliminates collisions between native NRTDs 101 and device adapters. This is accomplished by determining whether a packet originates from a prior art device or from a device connected to a device adapter 1000, as discussed in detail below.

Universal repeater hub 3*b* includes a plurality of conventional Ethernet repeater hubs 3, preferably two repeater hubs as shown. One of the Ethernet repeater hubs 3 connects to native NRTDs 101, via Ethernet a plurality of ports 1036*b*-1036*g*, and the other Ethernet repeater hub 3 connects to device adapters 1000 via a plurality of ports 1034*b*-1034*g*. As there are two separate Ethernet repeater hubs 3, packet transmissions from both the device adapters 1000 and the connected native. NRTDs 101 may be buffered, which is discussed in detail below. Exemplary universal repeater hub 3b includes a processor 1030 connected to the conventional Ethernet repeater hubs 3 via respective Ethernet interfaces 1032a and 1032b. Accordingly, processor 1030 can independently communicate with devices attached to either of the Ethernet repeater hubs 3.

Exemplary processor 1030 operates analogously as a device adapter 1000 on behalf of the attached native NRTDs 101. In particular, packets received from a native NRTD 101 may be temporarily stored in a memory device 1035 connected to the processor 1030 before being forwarded through port 1034a of the Ethernet repeater hub connected with device adapters 1000. Such forwarding, through Ethernet interface 1032a, is preferably carried out in accordance with the condition mode of the arbitration mechanism described above. Conversely, packets received from device adapters 1000 are forwarded through port 1036a of the Ethernet repeater hub connected to the native NRTDs 101. Packet transmissions on Ethernet interface 1032b are preferably carried out in accordance with standard CSMA/CD protocol.

Regarding buffering, a real-time packet received at one of the ports 1034 of a first of the repeater hubs 3 (i.e., the repeater hub dedicated to the device adapters) and addressed to a device connected to another one of the ports 1034 of the first repeater hub 3 is not buffered but is rather repeated out of all the ports 1034 of the first repeater hub 3 to transmit the packet to the addressed device. However, if a real-time packet received at one of the ports 1034 of the first repeater hub 3 is addressed to a device connected to one of the ports 1036 of a second of the repeater hubs 3 (i.e., the repeater hub dedicated to conventional NRTDs), then such a packet is buffered by the processor 1030 until the second Ethernet repeater hub is idle as per the CSMA/CD protocol.

In addition, a non-real-time packet received at one of the ports 1036 of the second repeater hub 3 and addressed to a device connected to one of the ports 1034 of the first repeater hub may be buffered by the processor 1030 until the next free-access phase, during which time such a packet is repeated to each of the ports 1034 to transmit the packet to the addressed device. During free-access phases, the repeater hubs 3 essentially act as a single hub, with each incoming packet transmitted directly to the addressed device without the need to buffer the packets, for example, by broadcasting the incoming packets to each of the ports.

Exemplary universal Ethernet repeater hub 3b may also include a clock source 1031 so that the universal repeater hub 3b can act as a master timing source as described above. Moreover, as described above, the processor 1030 can also serve as the master scheduling device. In addition, uplink ports 1033a and 1033b of the Ethernet repeater hubs 3 can be used to connect with additional repeater hubs (not shown) to provide more ports for connecting with additional device adapters and native NRTDs 101.

Universal Ethernet Repeater Hub with Configurable Ports

Figure 12:
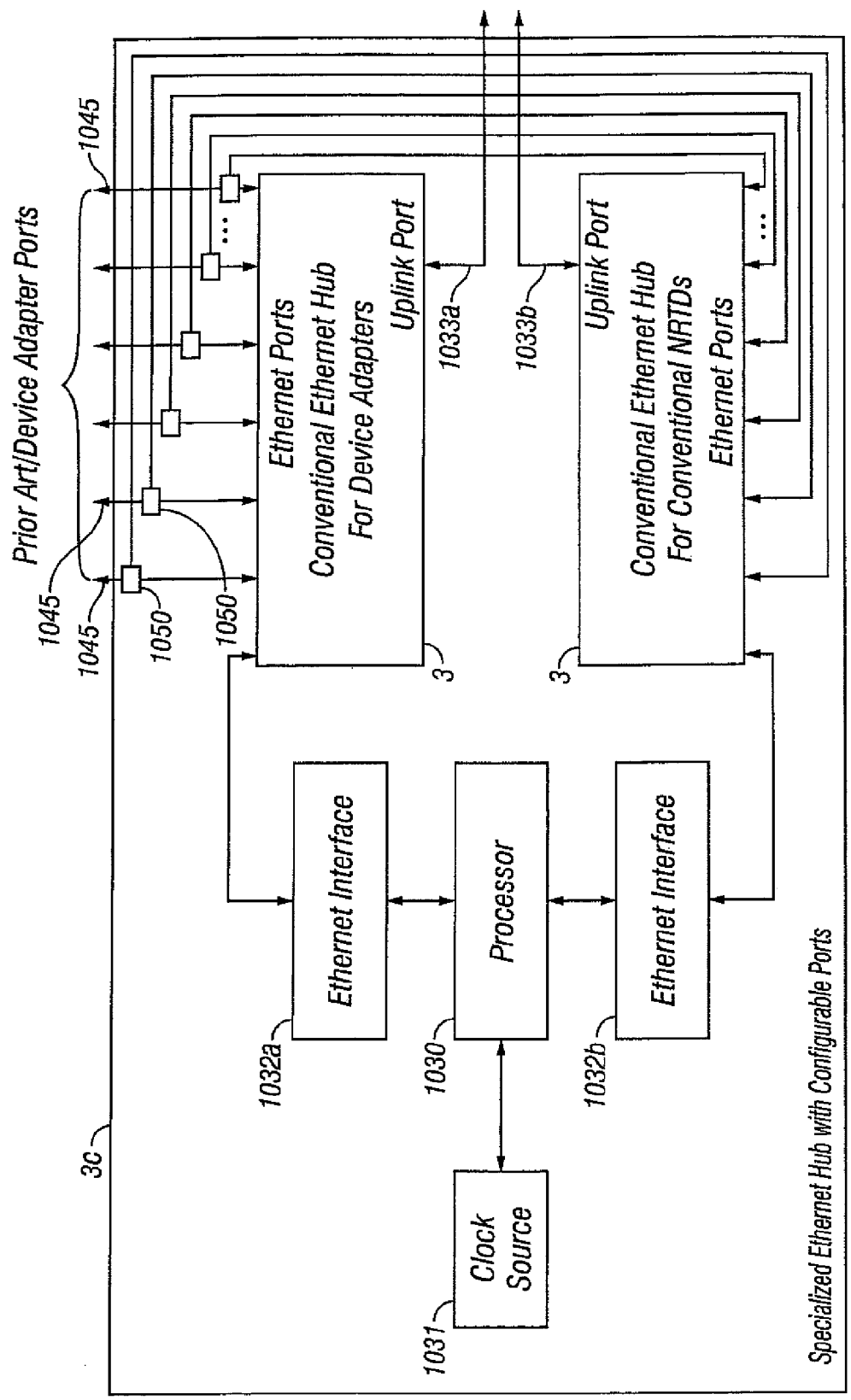
FIG. 12 is a block diagram of a specialized Ethernet repeater hub incorporating a master timing source and associated configurable processor, as well as ports that can be configured to connect to either device adapters or prior art Ethernet devices.

Another exemplary embodiment of the universal Ethernet repeater hubs of the present invention is illustrated in FIG. 12 and indicated by reference numeral 3c. Exemplary universal Ethernet repeater hub 3c includes a plurality (e.g., a pair) of conventional Ethernet repeater hubs 3 each with a plurality of ports. In contrast to the embodiment of the universal repeater hub 3b shown in FIG. 11 in which two sets of ports (i.e., one for connected to device adapters and one for connecting to native NRTDs) are provided, exemplary universal repeater hub 3c shown in FIG. 12 includes one set or type of port configured for connecting to either a device adapter 1000 or a native NRTD 101. The architecture of exemplary universal Ethernet repeater hub 3c shown in FIG. 12 is analogous to exemplary universal Ethernet repeater hub 3b shown in FIG. 11 except for the inclusion of a plurality of ports 1045 respectively connected to a plurality of switches 1050.

Each of the ports 1045 is connected to either a device adapter 1000 or a conventional NRTD 101. The switches 1050 select which of the Ethernet repeater hubs 3 an attached device is connected to by determining whether a particular port 1045 is connected to a device adapter 1000 or a conventional NRTD 101. The switches 1050 may be controlled manually but are preferably controlled automatically. Manual control may be accomplished with mechanical switches. The automatic control of the switches 1050 may be accomplished electrically. Such electrical control may require additional hardware (not shown) to determine which type of device a port is attached to. The requirements of such additional hardware will become apparent to someone skilled in the art.

In accordance with the present invention, each of the switches 1050 in conjunction with the processor 1030 determines whether the port 1045 corresponding thereto is connected to either a device adapter 1000 or a conventional NRTD 101. If a port 1045 is connected to a device adapter 1000, then all packets received at that port are directed to the first of the repeater hubs 3 by the corresponding switch 1050. Conversely, if a port 1045 is connected directly to a conventional NRTD 101, then all packets received at that port are directed to the second of the repeater hubs 3 by the corresponding switch 1050. The switches 1050 may determine whether a port 1045 is connected to a device adapter 1000 by, for example, having the processor 1030 send a timing signal or other special packet from the clock source 1031 to the device connected thereto as described above. If an appropriate response signal is returned, then the device connected to that particular port is a device adapter; if no signal is returned, then the device connected to that port is a conventional NRTD.

Dynamic Operation

In the arbitration mechanisms described above, each device adapter 1000 in the network owned a phase in every Frame. If a device adapter 1000 is not actively carrying any real-time traffic (e.g., a telephone is on hook), the device adapter may be desirable to de-allocate the phase owned by this inactive device adapter. Using non-real-time packets, the device adapters 1000 may coordinate to agree on how many phases are in each frame and on the ownership of the phases. Each device adapter 1000, active or not, may be periodically required to transmit a packet announcing its existence. Each device adapter 1000 may then maintain a table of device adapter that have announced their existence, which entries expire if a corresponding announcement is not heard before a timer expires. The addresses of the device adapters in this table then define a natural ordering between the device adapters 1000 in the network, which can be used to define the order of ownership of owned phases during a frame, and to define the master scheduling device.

In addition to Ethernet networks, the principles of the present invention may be applied in conjunction with networks operating in accordance time division multiple access (TDMA) or synchronous optical network (SONET) protocols. For example, asynchronous transfer mode SONET (ATM/SONET) networks transmit large Frames with predetermined fixed time slots at regular intervals. A SONET frame may be received on an OC3 line by a device adapter 1000 and particular cells from the SONET frame may be converted into or configured as a packet in an assigned phase of the present invention. For example, specific time slots of the SONET frame that have been assigned to a particular virtual channel may be assigned to respective device adapters from a remote Conditioned sub-network (i.e., a network connected to a device adapter 1000 of the invention). Accordingly, the device adapters 1000 of the present invention are not only compatible with conventional network hardware but also provide compatibility across network protocols.

Systems and techniques described herein may be used with wireless networks (e.g., WiFi and other CSMA wireless networks, TDMA networks, etc.), and with wired networks employing a variety of physical layers (e.g., Ethernet and SONET networks).

For example, the systems and techniques may be used with powerline communication (PLC) networks, home phone line (HPN) networks (e.g., networks conforming to Home Phoneline Networking Alliance (Home PNA) standards), and cable networks (e.g., quadrature amplitude modulation (QAM) networks).

Figure 13:
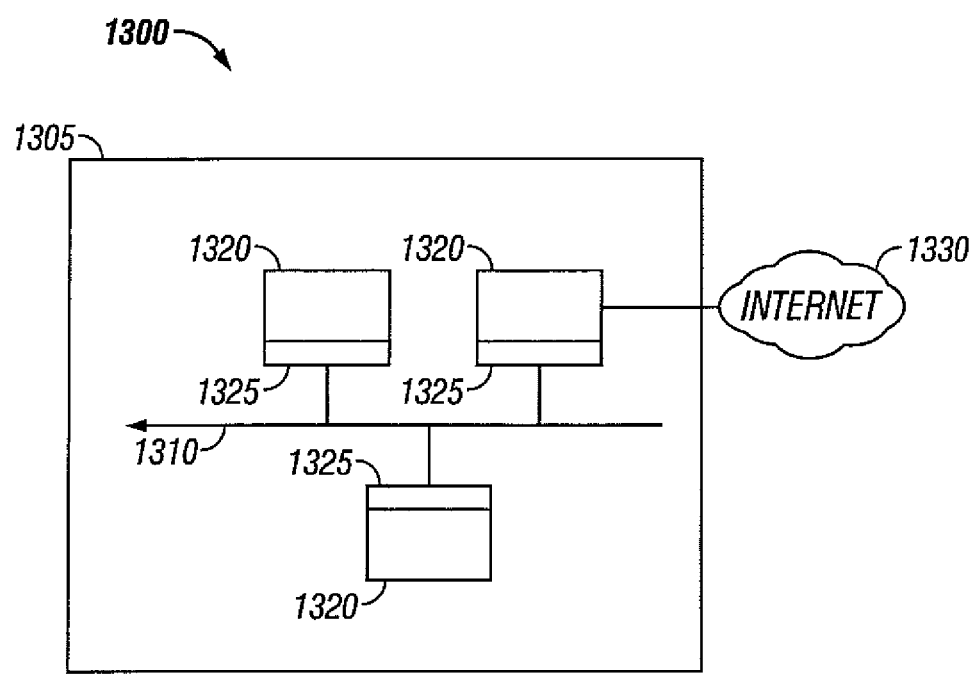
FIG. 13 is a schematic view of an exemplary network in accordance with some implementations.

FIG. 13 shows an exemplary network 1300. In an implementation, network 1300 is a PLC network. PLC networks provide for data communication using existing powerlines rather than dedicated data communication infrastructure. Network 1300 may provide data communication for a number of devices 1320 via lines 1310 (in this implementation, powerlines). Network 1300 may be a local powerline communication network for a location 1305 such as a house or building. Typically, network 1300 will be in communication with the Internet 1330 through one of the devices 1320 on the network.

Devices 1320 may each include a device adapter 1325 to receive data from the associated device 1320 and to transmit data onto the powerline 1310 according to a frame of time including at least one assigned time phase and a free access phase. The frame of time may be substantially synchronized among the device adapters 1325. Any of the device adapters 1325 may transmit data on the network 1300 during an assigned time phase for the particular device adapter 1325, or during the free access phase or both. If any of the devices 1320 is not generating data for transmission, its device adapter 1325 may be deemed inactive, and may not have a time phase assigned.

In another implementation, network 1300 may be a home phoneline network (HPN), with lines 1310 being standard telephone lines. As above, device adapters 1325 may transmit data on the network 1300 during an assigned time phase for the particular device adapter 1325, or during the free access phase or both.

Figure 14:
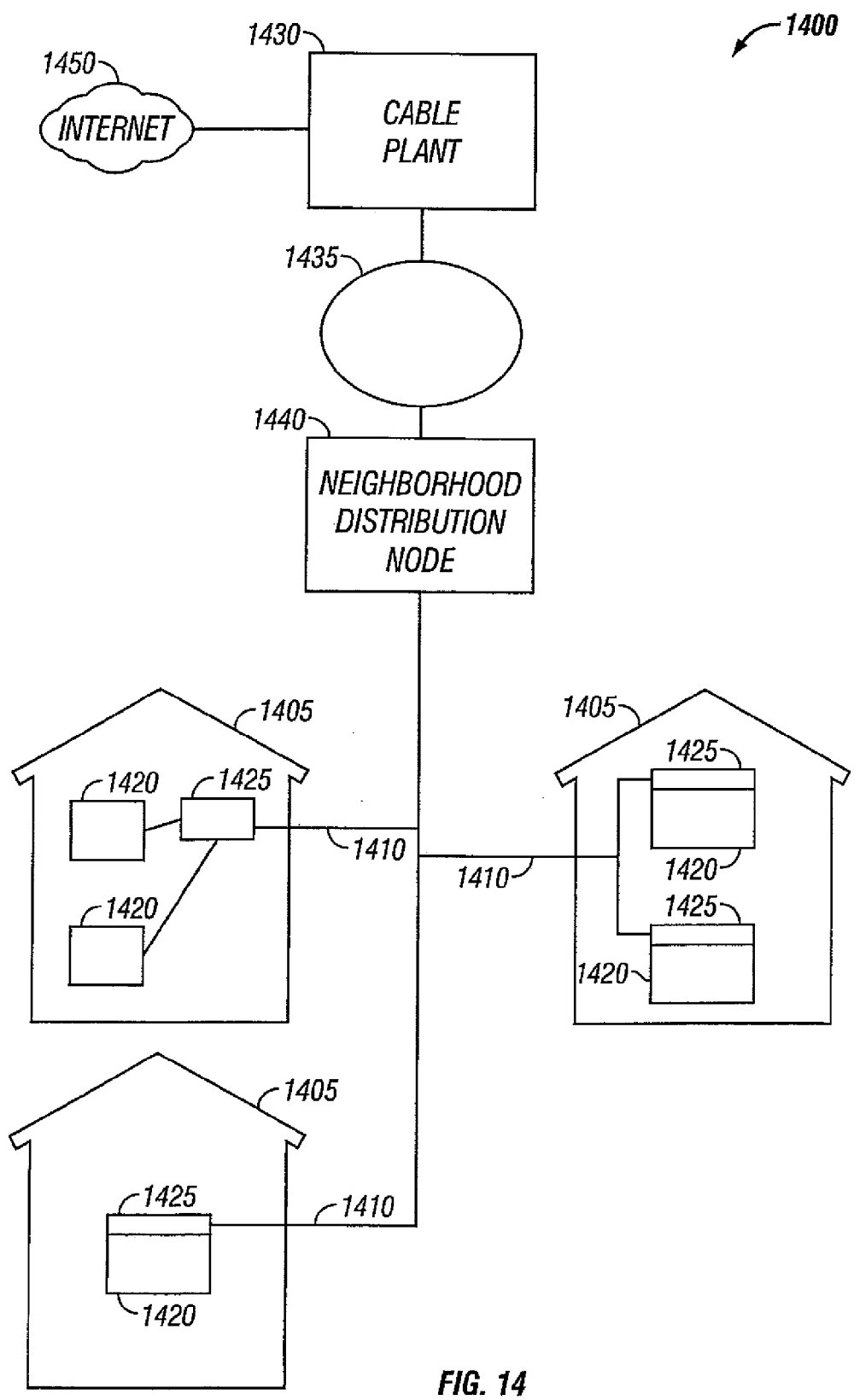
FIG. 14 is a schematic view of another exemplary network in accordance with some implementations.

In another implementation, the current systems and techniques may be used in a cable network. FIG. 14 shows an implementation of a cable network 1400 incorporating a hybrid fiber coax (HFC) medium. The HFC medium supports two-way traffic by the modulation/demodulation of data signals of frequency spectrum bands. For example, data signals may be communicated on network 1400 by quadrature amplitude modulation (QAM) of carrier waves, quadrature phase-shift keying (QPSK), or other modulation schemes that encode groups of binary digits as modulated symbols. A cable plant 1430 delivers content (e.g., some or all of video, audio, data or other content) to users and may also receive content from users.

For example, cable plant 1430 may send content to and receive content from one or more locations 1405 (e.g. homes, businesses, etc.). The content may be transmitted to a multitude of neighborhoods through a fiber ring distribution network 1435. The content may be transmitted a neighborhood distribution node 1440 to locations 1405 via coaxial cable lines 1410, which may be in a tree configuration as shown. This combination of fiber distribution rings and last-mile coaxial cable distribution to the home is generally referred to as a Hybrid Fiber-Coax network, or HFC. Note that there may be many users upstream of the particular group of locations 1405 shown.

Each location 1405 may include one or more devices 1420 for generating and/or receiving content. Each device 1420 may be in communication with a device adapter 1425 that is configured to receive content from the network and provide it to device 1420, as well as to receive content from device 1420 to provide it to the network.

In some existing systems, cable plant 1430 manages data according to a protocol in accordance with Data Over Cable Service Interface Specification (DOCSIS). In such a system, cable plant 1430 uses a TDMA system to govern transmission on the network by device adapters 1425, as well as any upstream devices on the network.

Using the current systems and techniques, content may be transmitted from a device 1420 by a device adapter 1425 according to a frame of time including at least one assigned time phase and a free access phase. Device adapters 1425 may transmit content during an assigned time phase, during the free access phase, or both. Non time-sensitive content (such as spreadsheet data, etc.) may be sent during the free access phase. During the free access phase, collisions may be handled using (for example), CSMA/CD to resend data.

During an assigned time phase, only one device adapter 1425 transmits content. Therefore, quality of service for time-sensitive content (such as video or voice content) may be preserved by transmitting the content during a device adapter's assigned time phase. The frame of time may be substantially synchronized among the device adapters 1425. If one or more for the devices 1420 is not generating data for transmission, its device adapter 1425 may be deemed inactive, and may not have a time phase assigned.

In contrast with a TDMA-only system, a hybrid system allows for more efficient utilization of the network for the short, bursty, random upstream traffic characteristics that typically characterize general Internet web browsing usage. For example, a single spontaneous upstream packet that would result from a click on a web link would no longer suffer the overhead and limitations of scheduling through the headend when using the free-access mechanism described herein.

A number of benefits may be provided by managing data transmission according to the current systems and techniques. Shared-medium networks, such as home phone line networks and cable distribution networks, incur long duration startup periods due to ringing, slow rise-times, and other forms of waveform degradation. A collision forces a repeat of this startup delay. Media access control (MAC) mechanisms, such as CSMA/CD, may be inefficient for networks in which significant ringing occurs, because the backoff times required to allow the ringing to subside to an acceptable level may be unduly long.

Assigned time phases such as described herein may thus allow for improved throughput in such networks by avoiding such collisions. Ringing may be a particular problem in HPN and PLC networks, which are generally unterminated and run in a single bus for a particular residence or business. Ringing and the associated increase in backoff times may also be a problem for cable (e.g., QAM) networks, due to the time sensitivity of content delivered over the networks.

As noted above, although TDMA systems may avoid startup transients, they may be inefficient for Internet data access some networks, such as DOCSIS cable networks using QAM or QPSK. Upstream transmission delays for TDMA DOCSIS networks may measure in the tenths of seconds to one second as a result of the wait required for a particular slot to come around. Thus, a free access phase as described herein may significantly shorten transmission delays and increase system responsiveness.

Those skilled in the art will understand that the embodiments of the present invention described above exemplify the present invention and do not limit the scope of the invention to these specifically illustrated and described embodiments. The scope of the invention is determined by the terms of the appended claims and their legal equivalents, rather than by the described examples. In addition, the exemplary embodiments provide a foundation from which numerous alternatives and modifications may be made, which alternatives and modifications are also within the scope of the present invention as defined in the appended claims.

What is claimed is:

1. A device adapter, comprising:
   a transmission unit configured to transmit data from a real time device via a network according to a time frame, wherein the time frame is substantially synchronized in the device adapter and at least one other device adapter, the time frame repeating periodically and including a plurality of assigned time phases and a free access phase,
   wherein the device adapter is configured to transmit data during at least one of an assigned time phase associated with the device adapter prior to transmission of data from the real-time device by the device adapter, and included in the plurality of assigned time phases, or the free access phase, to refrain from transmitting data during time phases of the plurality of assigned time phases that are not associated with the device adapter, and to be able to determine whether to transmit or defer transmission of data during the assigned time phase associated with the device adapter and the free access phase to allow the another device to transmit data.

2. The device adapter of claim 1, wherein the device adaptor is configured to determine to defer transmission of data when the data is not in danger of missing any associated deadlines, and to transmit data when the data is in danger of missing the associated deadlines.

3. The device adapter of claim 2, further configured to implement a determination to defer transmission of data by delaying transmission for a predetermined period which is longer than a defer transmission period implemented in a protocol of the another device.

4. The device adapter of claim 2, further configured to implement a determination to transmit data by transmitting data during data transmission by the another device, thereby causing a collision, and to continue data transmission after the collision.

5. The device adapter of claim 1, further configured to transmit data during data transmission by the another device, thereby causing a collision, and to continue data transmission after the collision.

6. A method, comprising:
   obtaining, at a device adapter, a substantially synchronized time frame which is maintained among a plurality of device adapters interconnected by a network, the time frame repeating periodically and including a plurality of assigned time phases and a free access phase;
   controlling transmission of data during at least one of an assigned time phase assigned to the device adapter prior to transmission of real-time data by the device adapter, and included in the plurality of assigned time phases, or the free access phase;
   refraining from transmitting data during time phases of the plurality of assigned time phases that are not associated with the device adapter,
   determining whether to defer transmission of data during the assigned time phase assigned to the device adapter if the device adapter has data to transmit during the assigned time phase assigned to the device adapter, to allow another device to transmit data during the assigned time phase assigned to the device adapter; and
   determining whether to defer transmission of data during the free access phase if the device adapter has data to transmit during the free access phase, to allow the another device to transmit data during the free access phase.

7. The method of claim 6, wherein the determining whether to defer transmission of data comprises determining to defer transmission of data when the data is not in danger of missing any associated deadlines, and to transmit data when the data is in danger of missing the associated deadlines.

8. The method of claim 7, further comprising delaying, in response to a determination to defer transmission of data, transmission for a predetermined period which is longer than a defer transmission period implemented in a protocol of the another device.

9. The device adapter of claim 7, further comprising transmitting, in response to a determination to transmit data, data during data transmission by the another device, thereby causing a collision, and to continue data transmission after the collision.

10. The method of claim 7, further configured to transmit data during data transmission by the another device, thereby causing a collision, and to continue data transmission after the collision.

11. A non-transitory computer readable medium containing instructions that, in response to execution by a processor, result in the implementation of operations comprising:
    obtaining, at a device adapter, a substantially synchronized time frame which is maintained among a plurality of device adapters interconnected by a network, the time frame repeating periodically and including a plurality of assigned time phases and a free access phase;
    controlling transmission of data during at least one of an assigned time phase assigned to the device adapter prior to transmission of real-time data by the device adapter, and included in the plurality of assigned time phases, or the free access phase;
    refraining from transmitting data during one or more time phases of the plurality of assigned time phases that are not associated with to the device adapter; and
    determining whether to defer transmission of data during the assigned time phase assigned to the device adapter if the device adapter has data to transmit during the assigned time phase assigned to the device adapter, to allow another device to transmit data during the assigned time phase assigned to the device adapter; and
    determining whether to defer transmission of data during the free access phase if the device adapter has data to transmit during the free access phase, to allow the another device to transmit data during the free access phase.

12. The non-transitory computer readable medium of claim 11, wherein the determining whether to defer transmission of data comprises determining to defer transmission of data when the data is not in danger of missing any associated deadlines, and to transmit data when the data is in danger of missing the associated deadlines.

13. The non-transitory computer readable medium of claim 12, further comprising delaying, in response to a determination to defer transmission of data, transmission for a predetermined period which is longer than a defer transmission period implemented in a protocol of the another device.

14. The non-transitory computer readable medium of claim 12, further comprising transmitting, in response to a determination to transmit data, data during data transmission by the another device, thereby causing a collision, and to continue data transmission after the collision.

15. The non-transitory computer readable medium of claim 11, further configured to transmit data during data transmission by the another device, thereby causing a collision, and to continue data transmission after the collision.

16. An apparatus, comprising:
    means for obtaining, at a device adapter, a substantially synchronized time frame which is maintained among a plurality of device adapters interconnected by a network, the time frame repeating periodically and including a plurality of assigned time phases and a free access phase;
    means for controlling transmission of data during at least one of an assigned time phase assigned to the device adapter prior to transmission of real-time data by the device adapter, and included in the plurality of assigned time phases, or the free access phase;
    means for refraining from transmitting data during one or more time phases of the plurality of assigned time phases that are not associated with to the device adapter; and
    means for determining whether to defer transmission of data during the assigned time phase assigned to the device adapter if the device adapter has data to transmit during the assigned time phase assigned to the device adapter, to allow another device to transmit data during the assigned time phase assigned to the device adapter, and
    means for determining whether to defer transmission of data during the free access phase if the device adapter has data to transmit during the free access phase, to allow the another device to transmit data during the free access phase.

17. The apparatus of claim 16, wherein the means for determining whether to defer transmission of data comprises means for determining to defer transmission of data when the data is not in danger of missing any associated deadlines, and to transmit data when the data is in danger of missing the associated deadlines.

18. The apparatus of claim 17, further comprising means for delaying, in response to a determination to defer transmission of data, transmission for a predetermined period which is longer than a defer transmission period implemented in a protocol of the another device.

19. The apparatus of claim 17, further comprising means for transmitting, in response to a determination to transmit data, data during data transmission by the another device, thereby causing a collision, and to continue data transmission after the collision.

20. The apparatus of claim 16, further comprising means for transmitting data during data transmission by the another device, thereby causing a collision, and to continue data transmission after the collision.

* * * * *